(12) United States Patent
Choi et al.

(10) Patent No.: US 10,359,608 B2
(45) Date of Patent: Jul. 23, 2019

(54) BIFOCAL LENS AND IMAGING DEVICE INCLUDING SAME

(71) Applicant: SAMSUNG ELECTRONICS CO., LTD., Suwon-si (KR)

(72) Inventors: Jong-chul Choi, Suwon-si (KR); Jin-won Lee, Seongnam-si (KR); Chong-sam Chung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/039,717

(22) PCT Filed: Jan. 14, 2015

(86) PCT No.: PCT/KR2015/000368
§ 371 (c)(1),
(2) Date: May 26, 2016

(87) PCT Pub. No.: WO2015/108327
PCT Pub. Date: Jul. 23, 2015

(65) Prior Publication Data
US 2016/0377842 A1    Dec. 29, 2016

(30) Foreign Application Priority Data

Jan. 14, 2014 (KR) .......... 10-2014-0004712
Jun. 27, 2014 (KR) .......... 10-2014-0079952

(51) Int. Cl.
*G02B 13/00* (2006.01)
*G02B 3/10* (2006.01)
(Continued)

(52) U.S. Cl.
CPC .......... *G02B 13/0065* (2013.01); *G02B 3/10* (2013.01); *G02B 17/084* (2013.01); *G02B 27/141* (2013.01)

(58) Field of Classification Search
CPC .......... G02B 1/041; G02B 1/043; G02B 3/10; G02B 17/00; G02B 17/008; G02B 17/02;
(Continued)

(56) References Cited

U.S. PATENT DOCUMENTS 4,950,056 A * 8/1990 Smith ............... G02B 17/0808
359/211.2
5,042,928 A * 8/1991 Richards ........... G02B 17/0808
359/724
(Continued)

FOREIGN PATENT DOCUMENTS

| CN | 101874219 A | 10/2010 |
|---|---|---|
| JP | 2007-212962 A | 8/2007 |
| KR | 10-2009-0097692 A | 9/2009 |

OTHER PUBLICATIONS

Communication dated Jun. 5, 2017 by the State Intellectual Property Office of P.R. China in counterpart Chinese Patent Application No. 201580004332.X.
(Continued)

*Primary Examiner* — Thong Q Nguyen
(74) *Attorney, Agent, or Firm* — Sughrue Mion, PLLC

(57) ABSTRACT

Disclosed are a bifocal lens having two focal distances to enable near image capturing and far image capturing and capable of being manufactured to have a thin profile, and an imaging device including same. A bifocal lens according to disclosed embodiments may include: a refractive optical system having at least one refractive lens element and having a first focal distance; and a reflective optical system having multiple reflective surfaces and having a second focal distance that is different from the first focal distance. Because the refractive optical system and the reflective optical system have mutually different focal distances, the
(Continued)

bifocal lens according to an embodiment may be capable of both near image capturing and far image capturing.

18 Claims, 25 Drawing Sheets

(51) Int. Cl.
*G02B 17/08* (2006.01)
*G02B 27/14* (2006.01)

(58) Field of Classification Search
CPC .. G02B 17/06; G02B 17/0605; G02B 17/061; G02B 17/0626; G02B 17/0631; G02B 17/0647; G02B 17/0652; G02B 17/08; G02B 17/0804; G02B 17/0808; G02B 17/082; G02B 17/0824; G02B 17/0836; G02B 17/084; G02B 17/086; G02B 27/1066; G02B 27/12; G02B 27/14; G02B 27/141; G02B 27/142
See application file for complete search history.

(56) References Cited

U.S. PATENT DOCUMENTS

| | | | | |
|---|---|---|---|---|
| 5,161,051 A | * | 11/1992 | Whitney | G02B 13/146 244/3.16 |
| 5,638,219 A | * | 6/1997 | Medina Puerta | G02B 17/004 359/729 |
| 6,166,866 A | * | 12/2000 | Kimura | G02B 17/0663 348/E5.025 |
| 6,341,044 B1 | * | 1/2002 | Driscoll, Jr. | G02B 13/06 348/E5.055 |
| 6,450,455 B1 | * | 9/2002 | Davis | B64G 1/365 244/171 |
| 7,180,659 B2 | * | 2/2007 | Doittau | G02B 17/0652 359/364 |
| 8,238,042 B2 | * | 8/2012 | DeWitt | G02B 5/001 359/709 |
| 8,680,450 B2 | * | 3/2014 | Pritchard | F41G 7/008 244/3.1 |
| 9,933,604 B1 | * | 4/2018 | Lu | G02B 17/0884 |
| 2013/0265507 A1 | | 10/2013 | Ford et al. | |
| 2016/0323504 A1 | * | 11/2016 | Ono | H04N 5/2259 |
| 2017/0180643 A1 | * | 6/2017 | Pixton | H04N 5/23245 |

OTHER PUBLICATIONS

Written Opinion [PCT/ISA/237] dated Apr. 21, 2015 issued by the International Searching Authority in International Application No. PCT/KR2015/000368.
Communication dated Nov. 1, 2017, issued by the State Intellectual Property Office of P.R. China in counterpart Chinese Application No. 201580004332.X.
Communication dated Dec. 2, 2016, issued by the State Intellectual Property Office of P.R. China in counterpart Chinese Application No. 201580004332.X.

* cited by examiner

FIG. 12

|  | Surface type | Y radius | Thickness | Material |
|---|---|---|---|---|
| S0 | Sphere | 1.00E+18 | 600 | |
| S1 | Sphere | 1.00E+18 | 0.76 | |
| S2 | Asphere | −3.46388 | 0.500942 | 743972.44850 |
| S3 | Asphere | −30.5783 | 0.1 | |
| S4 | Asphere | 1.947486 | 0.35213 | 487490.70405 |
| S5 | Asphere | −1.31435 | 0.1 | |
| S6 | Asphere | −5.36849 | 1.42 | 'PMMAH' |
| S7 | Asphere | 1.717354 | 1.247717 | |
| S8 | Asphere | −1.8155 | 0.972266 | 744992.42404 |
| S9 | Asphere | −2.10744 | 1.999274 | |
| S10 | Sphere | 1.00E+18 | 0.4 | BK7_SCHOTT |
| S11 | Sphere | 1.00E+18 | 0.110179 | |
| S12 | Sphere | 1.00E+18 | −0.01017 | |

FIG. 13

| Coefficient | K | A | B | C | D | E | F | G |
|---|---|---|---|---|---|---|---|---|
| S2 | 0 | -0.14028 | -0.05997 | 1.017865 | -2.12909 | 1.365679 | 0.038857 | -1.01E-15 |
| S3 | 0 | -0.4149 | 1.246563 | -0.55648 | 0.063865 | -1.68707 | 1.201944 | -2.55E-15 |
| S4 | 0 | -0.56679 | 1.569397 | 0.072769 | -0.30226 | -2.54638 | 7.676726 | -5.29871 |
| S5 | 0 | -0.00804 | 0.025923 | -0.51148 | 10.12714 | -25.3609 | 22.29039 | -3.17525 |
| S6 | 0 | -0.01832 | -0.00398 | 0.0028 | -0.00226 | 0.000411 | 5.90E-07 | -2.52E-08 |
| S7 | 0 | -0.01028 | -0.00588 | 0.000583 | -0.00127 | -5.03E-06 | 1.06E-06 | 1.21E-18 |
| S8 | 0 | 0.031707 | 0.006805 | 0.001129 | -0.00032 | -4.13E-15 | -3.35E-16 | 2.71E-20 |
| S9 | 0 | 0.021303 | -0.00243 | 0.003282 | -0.00089 | 9.38E-05 | 6.87E-17 | 3.27E-18 |

FIG. 14

|  | Surface type | Y radius | Thickness | Material | Refraction mode |
|---|---|---|---|---|---|
| S20 | Sphere | 1.00E+18 | 600 |  | Refract |
| S21 | Sphere | 1.00E+18 | 0.76 |  | Refract |
| S22 | Sphere | 1.00E+18 | 2.64 | 'PMMAH' | Refract |
| S23 | Asphere | −5.87968 | −1.2 | 'PMMAH' | Refract |
| S24 | Asphere | −6.78355 | 1.144 | 'PMMAH' | Refract |
| S25 | Asphere | 18.75446 | −1.72 | 'PMMAH' | Refract |
| S6 | Asphere | −5.36849 | −1.42 | 'PMMAH' | Refract |
| S7 | Asphere | 1.717354 | 1.247717 |  | Refract |
| S8 | Asphere | −1.8155 | 0.972266 | 744992.42404 | Refract |
| S9 | Asphere | −2.10744 | 1.999274 |  | Refract |
| S10 | Sphere | 1.00E+18 | 0.4 | BK7_SCHOTT | Refract |
| S11 | Sphere | 1.00E+18 | 0.835433 |  | Refract |
| S12 | Sphere | 1.00E+18 | −0.01017 |  | Refract |

FIG. 15

|  | K | A | B | C | D | E | F | G |
|---|---|---|---|---|---|---|---|---|
| S23 | -2.46153 | -0.00097 | 1.32E-05 | -5.36E-07 | 1.10E-08 | -2.44E-10 | 3.08E-12 | |
| S24 | -1.33704 | 0.000732 | -2.05E-04 | 1.86E-05 | -1.39E-06 | 5.89E-08 | -1.19E-09 | |
| S25 | 0 | -0.00886 | 8.34E-04 | -7.65E-05 | 5.31E-06 | -2.48E-07 | 6.65E-09 | -7.53E-11 |

FIG. 16

|  | S22 | S23 | S24 | S25 |
|---|---|---|---|---|
| EFFECTIVE EXTERNAL DIAMETER | 5.32 | 5.472 | 4.028 | 3.876 |
| EFFECTIVE INTERNAL DIAMETER | 4.32 | 3.952 | 2.318 | 1.52 |

FIG. 19

|  | Surface type | Y radius | Thickness | Material |
|---|---|---|---|---|
| S0 | Sphere | 1.00E+18 | 1.00e+050 |  |
| S1 | Sphere | 1.00E+18 | 1.124034 |  |
| S2 | Asphere | 2.791529 | 0.794498 | 651979.33444 |
| S3 | Asphere | 1.504296 | 0.316945 |  |
| S4 | Asphere | 4.164316 | 0.788557 | 670084.52274 |
| S5 | Asphere | -3.568947 | 0.367474 |  |
| S6 | Asphere | -49.767970 | 2.500000 | 'PMMAH' |
| S7 | Asphere | 6.486232 | 1.503601 |  |
| S8 | Asphere | -18.229545 | 0.473068 | 'PC' |
| S9 | Asphere | -9.227336 | 0.150890 |  |
| S10 | Asphere | -9.811201 | 0.920000 | 'PMMAH' |
| S11 | Asphere | -4.407487 | 0.388700 |  |
| S12 | Asphere | -4.787579 | 0.350000 | 'PC' |
| S13 | Asphere | -18.697715 | 0.923412 |  |
| S14 | Sphere | 1.00E+18 | 0.300000 | BK7 |
| S15 | Sphere | 1.00E+18 | 0.477958 |  |
| Image | Sphere | 1.00E+18 | 0.000000 |  |

FIG. 20

|  | R | K | A | B | C | D | E | F | G |
|---|---|---|---|---|---|---|---|---|---|
| S2 | 2.791529 | 0 | -0.03591 | -0.00966 | -0.00446857 | 0.002886 | -0.00043 | | |
| S3 | 1.504296 | 0 | -0.03256 | -0.02404 | -0.01624675 | 0.005636 | -0.00233 | | |
| S4 | 4.164316 | 0 | 0.050249 | 0.011511 | 0.004233426 | -0.00747 | 0.003746 | | |
| S5 | -3.56895 | 0 | 0.01609 | 0.008202 | 0.017335321 | -0.01304 | 0.010158 | | |
| S6 | -49.768 | 0 | -0.00195 | 5.70E-06 | 7.64E-07 | 4.26E-07 | -5.87E-08 | 3.22E-09 | -6.63E-11 |
| S7 | 6.486232 | 0 | -0.00503 | 0.000284 | 1.38E-05 | -2.38E-06 | 1.27E-07 | -2.72E-09 | -1.19E-13 |
| S8 | -18.2295 | 0 | 0.003149 | 8.07E-05 | -2.90E-05 | 2.51E-06 | -2.53E-09 | | |
| S9 | -9.22734 | 0 | 0.014857 | -0.00185 | 0.000169529 | -7.03E-06 | 7.90E-09 | | |
| S10 | -9.8112 | 0 | 0.013842 | -0.00281 | 0.000350982 | -1.52E-05 | -1.55E-10 | -9.11E-21 | |
| S11 | -4.40749 | 0 | 0.005508 | -0.00027 | 6.24E-05 | -1.37E-06 | 1.45E-09 | -2.20E-21 | |
| S12 | -4.78758 | 0 | 0.005658 | 3.69E-05 | -7.91E-05 | 2.54E-06 | -4.10E-10 | -3.72E-21 | |
| S13 | -18.6977 | 0 | 0.001976 | 1.28E-05 | -6.53E-05 | 3.06E-06 | 1.04E-08 | -1.09E-20 | |

FIG. 22

|  | Surface type | Y radius | Thickness | Material |
|---|---|---|---|---|
| S20 | Sphere | 1.00E+18 | 1.00E+50 |  |
| S21 | Sphere | 1.00E+18 | 1.124034 |  |
| S22 | Sphere | 1.00E+18 | 5.869659 | 'PMMAH' |
| S23 | Asphere | −13.7604 | −3.19858 | 'PMMAH' |
| S24 | Asphere | −9.99132 | 2.789299 | 'PMMAH' |
| S25 | Asphere | −103.096 | −3.27601 | 'PMMAH' |
| S6 | Asphere | −49.768 | 2.5 | 'PMMAH' |
| S7 | Asphere | 6.486232 | 1.503601 |  |
| S8 | Asphere | −18.2295 | 0.473068 | 'PC' |
| S9 | Asphere | −9.22734 | 0.150890 |  |
| S10 | Asphere | −9.8112 | 0.92 | 'PMMAH' |
| S11 | Asphere | −4.40749 | 0.388700 |  |
| S12 | Asphere | −4.78758 | 0.35 | 'PC' |
| S13 | Asphere | −18.6977 | 0.923412 |  |
| S14 | Sphere | 1.00E+18 | 0.3 | BK7_SCHOTT |
| S15 | Sphere | 1.00E+18 | 0.477958 |  |
| Image | Sphere | 1.00E+18 | 0 |  |

FIG. 23

|  | R | K | A | B | C | D | E | F | G |
|---|---|---|---|---|---|---|---|---|---|
| S23 | -13.7604 | -2.46153 | -5.91E-05 | 2.76E-07 | -1.36E-09 | 1.71E-11 | -1.13E-13 | 3.24E-16 |  |
| S24 | -9.99132 | -1.33704 | 0.000115 | -5.29E-06 | 1.94E-07 | -3.62E-09 | 3.67E-11 | -1.55E-13 |  |
| S25 | -103.096 | 0 | -0.00084 | 2.17E-05 | -4.84E-07 | 8.35E-09 | -1.03E-10 | 8.26E-13 | -3.23E-15 |

FIG. 24

|  | S2 | S3 | S4 | S5 |
|---|---|---|---|---|
| EFFECTIVE EXTERNAL DIAMETER | 11 | 11.15 | 7.93 | 7.5 |
| EFFECTIVE INTERNAL DIAMETER | 8.25 | 7.9 | 4.4 | 3.2 |

# BIFOCAL LENS AND IMAGING DEVICE INCLUDING SAME

CROSS-REFERENCE TO RELATED APPLICATIONS

This application is a 371 National stage entry of International Application No. PCT/KR2015/000368, filed Jan. 14, 2015, which claims priority to Korean Patent Application No. 10-2014-0004712, filed Jan. 14, 2014.

BACKGROUND

(1) Field

One or more embodiments of the present disclosure relate to a dual focus lens having two focal lengths and an image pickup apparatus including the dual focus lens, and more particularly, to a dual focus lens which may be thinly manufactured having two focal lengths for short distance and long distance photography, and an image pickup apparatus including the dual focus lens.

(2) Description of Related Art

Due to a recent trend in reducing sizes of not only compact cameras and cameras in mobile devices, but also sizes of mirrorless cameras and single-lens reflex cameras, there is a demand for the development of small camera lenses. In general, the small camera lenses are designed as single focus lenses. However, since the single focus lenses have fixed viewing angles, it is difficult to capture images with various photography effects by using the single focus lenses. In particular, the compact cameras and the cameras in the mobile devices are mostly designed to be appropriate for short distance photography, but not for long distance photography.

Among lenses for short distance and long distance photography, a multifocal lens having a plurality of focal lengths or a zoom lens having a variable focal length is mostly used. However, the zoom lens used in the compact cameras usually includes at least six lenses, thereby causing cameras to be long and heavy. Although the mirrorless cameras and the single-lens reflex cameras may be used by changing various single focus lenses having different focal lengths, there are still problems in that long focus lenses for long distance photography are long and large, and there are also inconveniences of having to change lenses. Furthermore, since the cameras in the mobile devices are relatively small, it is difficult to apply the zoom lens in the cameras in the mobile devices. Even when an additional lens may be externally attached to a camera in a mobile device by using an adapter so as to perform long distance photography, the camera in the mobile device may increase in size. Recently, lenses in which two optical systems having different focal lengths are integrated are being developed. However, such lenses require two image sensors, thereby causing an increase in a manufacturing cost and a size of a camera.

SUMMARY

One or more embodiments include a dual focus lens which may be thinly manufactured having two focal lengths for short distance and long distance photography, and an image pickup apparatus including the dual focus lens.

According to one or more embodiments, a dual focus lens includes a refractive optical system having a first focal length, the refractive optical system including at least one refractive lens element; and a reflective optical system having a second focal length that is different from the first focal length, the reflective optical system including a plurality of reflection surfaces. The refractive optical system and the reflective optical system respectively have a first image plane and a second image plane, and the refractive optical system and the reflective optical system are both located at an object side with respect to the first and second image planes.

The refractive optical system and the reflective optical system may be located having a common optical axis in the center.

The refractive optical system may be located at the object side and the reflective optical system is located at an image side, and the center of the reflective optical system may include a first light incident region on which light emitted from the refractive optical system is incident, and a light emission region which emits light incident on the first light incident region to the image side.

The dual focus lens may further include at least one common lens element located at the image side with respect to the refractive optical system and the reflective optical system, the at least one common lens element focusing light emitted from the refractive optical system on the first image plane and light emitted from the reflective optical system on the second image plane.

The at least one common lens element may be designed to be movable in a direction of an optical axis or a direction perpendicular to the optical axis.

In a direction from the object side to the image side, the refractive optical system may include a meniscus lens having a negative refractive power that includes a concave surface facing the object side and a convex surface facing the image side, and a biconvex lens. The at least one common lens element may include a meniscus lens having a negative refractive power that includes a concave surface facing the object side and a convex surface facing the image side.

In a direction from the object side to the image side, the refractive optical system may include a meniscus lens having a negative refractive power that includes a convex surface facing the object side and a concave surface facing the image side, and a biconvex lens. In a direction from the object side to the image side, the at least one common lens element may include first and second meniscus lenses having a positive refractive power that includes a concave surface facing the object side and a convex surface facing the image side, and a third meniscus lens having a negative refractive power that includes a concave surface facing the object side and a convex surface facing the image side.

Respective locations of the first and second image planes with respect to an optical axis may be the same.

Respective locations of the first and second image planes with respect to an optical axis may be different.

The reflective optical system may have a folded optics structure in which a light path is bent a plurality of times between the plurality of reflection surfaces.

The reflective optical system may include a second light incident region formed in a ring shape around a circumference of the reflective optical system. The plurality of reflection surfaces may be optically facing each other so that light incident through the second light incident region is emitted to the light emission region.

For example, the plurality of reflection surfaces may be formed in a ring shape having an optical axis in the center, and radii of the plurality of reflection surfaces with respect to the optical axis may decrease in a direction to which light incident through the second light incident region proceeds.

The dual focus lens may further include a first coating layer located in the first light incident region, the first coating layer transmitting light having a first wavelength and blocking light having other wavelengths; and a second coating layer located on at least one of the plurality of reflection surfaces, the second coating layer reflecting light having a second wavelength which is different from the first wavelength and absorbing or transmitting light having other wavelengths.

For example, any one of the first and second wavelengths may be in a visible light range and the other is in an infrared light range.

The dual focus lens may further include a transparent substrate on which the plurality of reflection surfaces are fixed.

The first and second light incident regions, and the light emission region may be formed on a surface of the transparent substrate.

Surface regions of the transparent substrate respectively corresponding to the first light incident region and the light emission region may be curved surfaces.

The plurality of reflection surfaces may be curved, and surface regions of the transparent substrate on which the plurality of the reflection surfaces are fixed may have shapes that correspond to respective curved shapes of the plurality of reflection surfaces.

The transparent substrate may include a first surface and a second surface that are facing each other and parallel with each other.

The dual focus lens may further include a first shutter transmitting or blocking light incident on the refractive optical system, and a second shutter transmitting or blocking light incident on the reflective optical system.

The first and second shutters may be configured such that one transmits light and the other blocks light, selectively.

At least one of the first and second shutters may be divided into at least two segments that are independently driven in a circumference direction For example, the second focal length may be longer than the first focal length.

The dual focus lens may further include at least one light source that is located in a space surrounding the refractive optical system.

According to one or more embodiments, an image pickup apparatus includes the dual focus lens having the aforementioned structure, and an image sensor located at an image side of the dual focus lens.

The image sensor may be divided into at least two independent segments.

Respective locations of the first and second image planes with respect to an optical axis may be different. The image sensor may move to the first image plane while the refractive optical system is photographing, and move to the second image plane while the reflective optical system is photographing.

The image sensor may be designed to be movable in a direction of an optical axis or a direction perpendicular to the optical axis.

At least one selected from the refractive optical system and the reflective optical system may be configured to have a zoom function.

The refractive optical system may be configured to form a first image having a first magnification, and the reflective optical system may be configured to form a second image having a second magnification that is greater than the first magnification.

The image pickup apparatus may be configured to form a third image having a magnification between the first magnification and the second magnification by cropping and magnifying the first image, reducing the second image, and synthesizing the first image and second images.

A dual focus lens according to the disclosed embodiments may include a refractive optical system including at least one refractive lens element and a reflective optical system including a plurality of reflection surfaces. Since the refractive optical system and the reflective optical system have different focal lengths, the dual focus lens of the present embodiments may be capable of both short distance and long distance photography. For example, the refractive optical system having a short focal length may be used for short distance photography, and the reflective optical system having a long focal length may be used for long distance photography.

Also, the reflective optical system may have a folded optics structure in which a light path bends a plurality of times between the reflection surfaces, and thus be short in a direction of an optical axis. Therefore, the dual focus lens according to the present embodiments may have two different focal lengths and also be thinly manufactured.

Furthermore, since the refractive optical system and the reflective optical system are located having a common optical axis in the center and image planes thereof are located at a substantially identical location, an image pickup device including the dual focus lens according to the present embodiments may use only one image sensor.

DESCRIPTION OF THE DRAWINGS

FIG. 12 is a table of specific optical data of a refractive optical system of a dual focus lens, according to a first embodiment;

FIG. 13 is a table of aspheric coefficients of aspheric surfaces of the refractive optical system of the dual focus lens, according to the first embodiment;

FIG. 14 is a table of specific optical data of a reflective optical system of the dual focus lens, according to the first embodiment;

FIG. 15 is a table of aspheric coefficients of aspheric surfaces of the reflective optical system of the dual focus lens, according to the first embodiment;

FIG. 16 is a table of diameters of a plurality of reflection surfaces of the reflective optical system of the dual focus lens, according to the first embodiment;

FIG. 19 is a table of specific optical data of the refractive optical system of the dual focus lens, according to the second embodiment;

FIG. 20 is a table of aspheric coefficients of aspheric surfaces of the refractive optical system of the dual focus lens, according to the second embodiment;

FIG. 22 is a table of specific optical data of the reflective optical system of the dual focus lens, according to the second embodiment;

FIG. 23 is a table of aspheric coefficients of an aspheric surface of the reflective optical system of the dual focus lens, according to the second embodiment;

FIG. 24 is a table of diameters of each of a plurality of reflection surfaces of the reflective optical system of the dual focus lens, according to the second embodiment.

DETAILED DESCRIPTION

Figure 1:
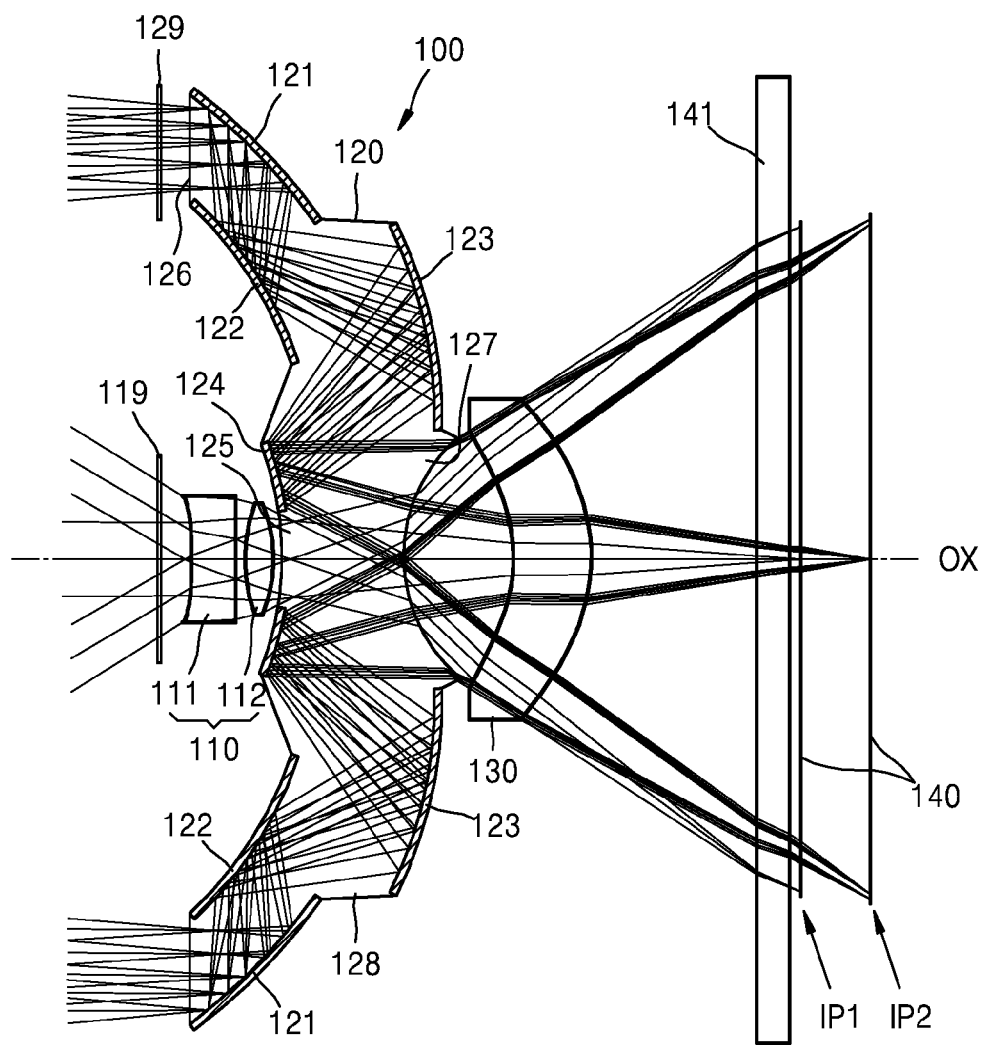
FIG. 1 is a schematic cross-sectional view of a dual focus lens and an image pickup apparatus including the dual focus lens, according to an embodiment.

Hereinafter, a dual focus lens and an image pickup apparatus including the same will be described in detail with reference to the accompanying drawings, wherein like reference numerals refer to like elements throughout. Sizes of components in the drawings may be exaggerated for convenience of explanation. In this regard, the present embodiments may have different forms and should not be construed as being limited to the descriptions set forth herein. Also, in the case where a position relationship between two items is described with the terms "on," "on the top of," or the like, one or more items may be interposed therebetween unless the term "directly" is used in the expression.

FIG. 1 is a schematic cross-sectional view of a dual focus lens 100 and an image pickup apparatus including the dual focus lens 100, according to an embodiment. Referring to FIG. 1, the dual focus lens 100 according to the present embodiment may include a refractive optical system 110 having a first focal length, and a reflective optical system 120 having a second focal length that is different from the first focal length. The refractive and reflective optical systems 110 and 120 may have a first image plane IP1 and a second image plane IP2, respectively. Although FIG. 1 illustrates an example in which respective locations of the first and second image planes IP1 and IP2 with respect to an optical axis OX are different, the respective locations of the first and second image planes IP1 and IP2 with respect to the optical axis OX may be the same depending on respective designs of the refractive and reflective optical systems 110 and 120.

The dual focus lens 100 may further include at least one common lens element 130 that is used in both of the refractive and reflective optical systems 110 and 120. The first focal length of the refractive optical system 110 is formed by functional actions of the refractive optical system 110 and the common lens element 130, and the second focal length of the reflective optical system 120 is formed by functional actions of the reflective optical system 120 and the common lens element 130. The common lens element 130 may be located at an image side with respect to the refractive and reflective optical systems 110 and 120. Although FIG. 1 illustrates an example in which there is only one common lens element 130, two or more common lens elements 130 may be used depending on designs of the dual focus lens. The common lens element 130 may be designed such that light emitted from the refractive optical system 110 is focused on the first image plane IP1, and light emitted from the reflective optical system 120 is focused on the second image plane IP2.

The image pickup apparatus according to the present embodiment may include the dual focus lens 100, and an image sensor 140 that is located at any one of the first and second image planes IP1 and IP2. For example, the image sensor 140 may be a charge-coupled device (CCD) image sensor or a complementary metal oxide semiconductor (CMOS) image sensor. A cover layer 141 may be additionally located on a light incident surface of the image sensor 140 so as to protect color filters and pixels of the image sensor 140.

As illustrated in FIG. 1, the refractive and reflective optical systems 110 and 120 may both be located at an object side with respect to the first and second image planes IP1 and IP2. In other words, the first image plane IP1 of the refractive optical system 110 and the second image plane IP2 of the reflective optical system 120 may be located in the same direction with respect to the refractive and reflective optical systems 110 and 120. Therefore, since the refractive and reflective optical systems 110 and 120 may form images on the same image sensor 140, the image pickup apparatus may capture images at different viewing angles by using only the image sensor 140 and without separate image sensors for each of the refractive and reflective optical systems 110 and 120 that have different focal lengths.

The refractive optical system 110 may include at least one refractive lens element disposed along the optical axis OX. Although FIG. 1 illustrates two refractive lens elements 111 and 112, the refractive optical system 110 may include only one, or three or more refractive lens elements depending on the design of the refractive optical system 110. The first and second refractive lens elements 111 and 112 may be formed of materials having different refractive indexes so as to suppress chromatic aberration of the dual focus lens 100.

A first shutter 119, which transmits or blocks light that is incident toward the refractive optical system 110, may be located in a light path of the refractive optical system 110. Although FIG. 1 illustrates that the first shutter 119 is located in front of the refractive optical system 110, a location of the first shutter 119 is not limited thereto. For example, the first shutter 119 may be located between the first and second refractive lens elements 111 and 112, or between the second refractive lens element 112 and the reflective optical system 120.

The reflective optical system 120 may be located along the same optical axis OX as the refractive optical system 110. In other words, the refractive and reflective optical systems 110 and 120 may be located having a common optical axis OX in the center. For example, as illustrated in FIG. 1, the refractive optical system 110 is located near the object side with respect to the optical axis OX, and the reflective optical system 120 is located near the image side with respect to the optical axis OX. Therefore, with respect to a direction from the object side to the image side, the refractive optical system 110 may be located at a front side and the reflective optical system 120 may be located at a rear side.

Referring to FIG. 1, the reflective optical system 120 may include a first light incident region 125 on which light emitted from the refractive optical system 110 is incident, a light emission region 127 which emits light incident to the first light incident region 125 to the image side, a second light incident region 126 formed in a ring shape around a circumference of the reflective optical system 120, and first to fourth reflection surfaces 121 to 124 disposed between the first and second light incident regions 125 and 126 in a radius direction having the optical axis OX in the center. The first light incident region 125 and the light emission region 127 may be located such that they face each other in the center of the reflective optical system 120. The first light incident region 125 is a region on which light to be imaged by the refractive optical system 110 is incident, and the second light incident region 126 is a region on which light to be imaged by the reflective optical system 120 is incident. Light incident on the first light incident region 125 and light incident on the second light incident region 126 may both be emitted to the image side through the light emission region 127.

The first to fourth reflection surfaces 121 to 124 of the reflective optical system 120 may optically face each other so that light incident on the second light incident region 126 is emitted toward the light emission region 127. The term "optically facing" indicates that the first to fourth reflection surfaces 121 to 124 are not physically facing one another, but are located such that light reflected from a reflection surface proceeds to another reflection surface. For example, the first reflection surface 121 reflects light incident on the second light incident region 126 to the second reflection surface 122. Then, the second reflection surface 122 reflects light to the third reflection surface 123, and the third reflection surface 123 reflects light to the fourth reflection surface 124. Lastly, reflected light from the fourth reflection surface 124 proceeds to the image side through the light emission region 127. Although FIG. 1 illustrates an example of four reflection surfaces 121 to 124, the present embodiment is not limited thereto, and at least two reflection surfaces may be used depending on the designs of the dual focus lens.

The first to fourth reflection surfaces 121 to 124 may have a ring shape having the optical axis OX in the center. Also, as illustrated in FIG. 1, radii of the first to fourth reflection surfaces 121 to 124 with respect to the optical axis OX may decrease in a direction to which light incident through the second light incident region 126 proceeds. For example, the first reflection surface 121 may have the largest radius with respect to the optical axis OX, and the fourth reflection surface 124 may have the smallest.

As described above, the reflective optical system 120 of the dual focus lens 100 according to the present embodiment may have a folded optics structure in which a light path bends a plurality of times between the first to fourth of reflection surfaces 121 to 124. In the folded optics structure, the light path may be extended by using the first to fourth reflection surfaces 121 to 124 so that a thickness (or a length in a direction of the optical axis OX) of the reflective optical system 120 may be greatly reduced regardless of the second focal length of the reflective optical system 120. Therefore, when the second focal length of the reflective optical system 120 is longer than the first focal length of the refractive optical system 110, the dual focus lens 100 may have two different focal lengths and also be thinly manufactured. The dual focus lens 100 according to the present embodiment may be used for both short distance and long distance photography by selectively using the refractive optical system 110 having the first focal length and the reflective optical system 120 having the second focal length. For example, the refractive optical system 110 having a short focal length may be used for short distance photography (wide angle), and the reflective optical system 120 having a long focal length may be used for long distance photography (telephoto). If a magnification between a wide angle position of the refractive optical system 110 and a telephoto position of the reflective optical system 120 is obtained by digitally zooming using an image signal processor (not shown) of the image pickup apparatus, it is possible to continuously zoom from the wide angle position to the telephoto position.

The first to fourth reflection surfaces 121 to 124 may be individually assembled and fixed in the image pickup apparatus. In this case however, a manufacturing process may be complicated, and a great amount of time may be necessary to accurately locate the first to fourth reflection surfaces 121 to 124 at their respective positions. Therefore, the first to fourth reflection surfaces 121 to 124 may be fixed onto a transparent substrate 128 and then located in the image pickup apparatus. The transparent substrate 128 may be formed of, for example, glass or a transparent material such as polymethylmethacrylate (PMMA). According to the present embodiment, in order to suppress chromatic aberration of the dual focus lens 100, a refractive index of the transparent substrate 128 may differ from that of the common lens element 130. For example, the transparent substrate 128 may be formed of PMMA and the common lens element 130 may be formed of a glass material having a refractive index different from that of PMMA. When using the transparent substrate 128 on which the first to fourth reflection surfaces 121 to 124 are fixed, the first light incident region 125, the second light incident region 126, and the light emission region 127 may be formed on a surface of the transparent substrate 128.

As illustrated in FIG. 1, a shape of the transparent substrate 128 may be complicated according to respective locations and shapes of the first to fourth reflection surfaces 121 to 124, the first light incident region 125, the second light incident region 126, and the light emission region 127. For example, when the first to fourth reflection surfaces 121 to 124 have respective curved shapes, surface regions of the transparent substrate 128 on which the first to fourth of reflection surfaces 121 to 124 are fixed may have shapes that respectively correspond to the respective curved shapes of the first to fourth reflection surfaces 121 to 124. The first to fourth reflection surfaces 121 to 124 may be reflection coatings formed by coating the corresponding surface regions of the transparent substrate 128. In order to assist image forming operations of the refractive and reflective optical systems 110 and 120, surface regions of the transparent substrate 128 that respectively correspond to the first light incident region 125 and the light emission region 127 may be curved surfaces having a refractive power. Although FIG. 1 illustrates that a surface region of the transparent substrate 128 corresponding to the second light incident region 126 is a plane, but the surface region of the transparent substrate 128 corresponding to the second light incident region 126 may also be a curved surface having a refractive power.

The dual focus lens 100 may additionally include a second shutter 129 that transmits or block light that is incident on the reflective optical system 120. For example, the second shutter 129 may be facing the second light incident region 126. The first shutter 119 that transmits or blocks light incident on the refractive optical system 110 and the second shutter 129 that transmits or blocks light incident on the reflective optical system 120 may be located at different locations with respect to the optical axis OX, but on the same plane. When the first and second shutters 119 and 129 are located on the same plane, the first and second shutters 119 and 129 may be formed on a single substrate. The first and second shutters 119 and 129 may be designed such that one transmits light and the other blocks light when necessary. For example, the first shutter 119 may be open and the second shutter 129 may be closed, or vice versa. The first and second shutters 119 and 129 may be, for example, mechanical shutters that mechanically open and close, electronic shutters that open and close by using polarized light or liquid crystal, or electrostatic shutters that open and close by using non-transmission ink layer.

Figure 2:
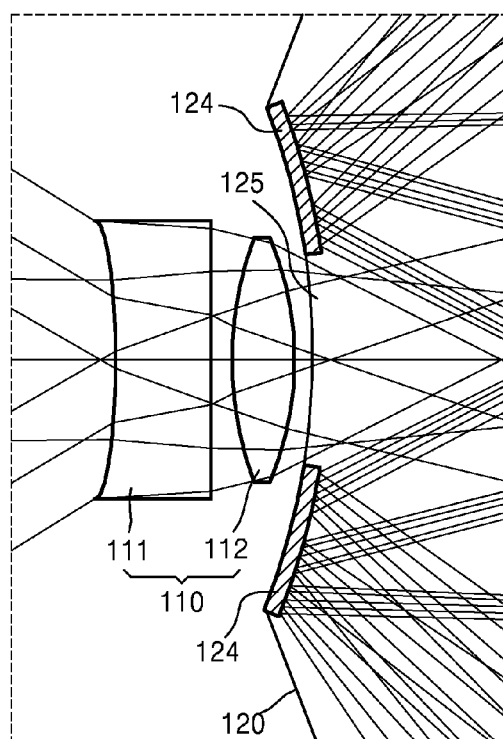
FIG. 2 is an enlarged partial sectional view of the center of a refractive optical system and a reflective optical system adjacent to the refractive optical system, which are included in the dual focus lens of FIG. 1.

FIG. 2 is an enlarged partial sectional view of the center of the refractive and reflective optical systems 110 and 120 adjacent to the refractive optical system 110, which are included in the dual focus lens 100 of FIG. 1. Referring to FIG. 2, the first light incident region 125 of the reflective optical system 120 is facing the refractive optical system 110. Also, the fourth reflection surface 124 is located at a circumference of the first light incident region 125. For example, the first light incident region 125 and the fourth reflection surface 124 may be located in the same surface region of the transparent substrate 128. That is, the first light incident region 125 and the fourth reflection surface 124 may be respectively located in the center and a circumference of a surface region of the transparent substrate 128 facing the refractive optical system 110. Since the first light incident region 125 is a region for the refractive optical system 110 and the fourth reflection surface 124 is a region for the reflective optical system 120, the first light incident region 125 and the fourth reflection surface 124 may have different surface characteristics. For example, the first light incident region 125 and the fourth reflection surface 124 may be curved surfaces having different radius of curvature. Alternatively, the first light incident region 125 and the fourth reflection surface 124 may be aspheric surfaces having the same radius of curvature but different aspheric coefficients.

A high transmission coating layer may be formed in the first light incident region 125 so that light emitted from the refractive optical system 110 may transmit the first light incident region 125. Also, a high reflection coating layer may be formed on the fourth reflection surface 124 so as to reflect light reflected from the third reflection surface 123. The high transmission coating layer and the high reflection coating layer may be formed to transmit or reflect light having the same wavelengths (e.g., visible light). However, the refractive and reflective optical systems 110 and 120 may form images by using light having different wavelengths. In this case, the high transmission coating layer and the high reflection coating layer may be formed to transmit or reflect light having different wavelengths. The high reflection coating layer may not only be formed on the fourth reflection surface 124, but on any one of the first to third reflection surfaces 121 to 123.

Figure 3:
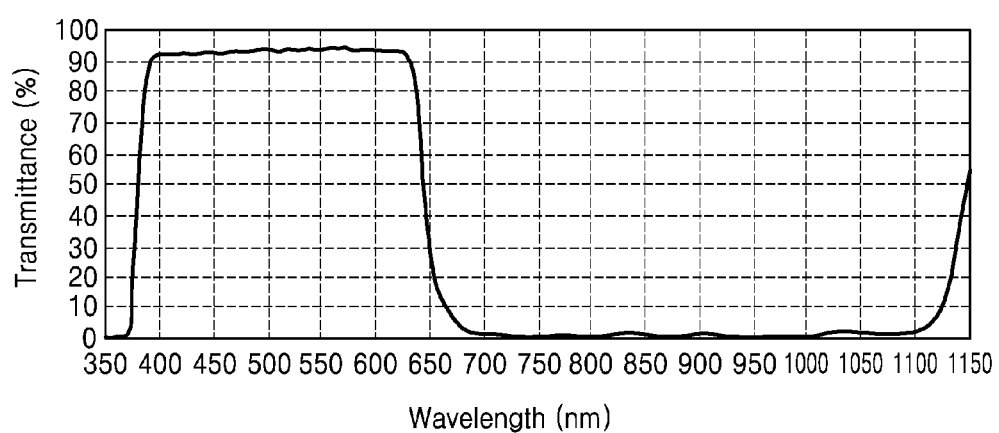
FIG. 3 is an exemplary graph of transmittance per wavelength of a transmission coating layer located in a light transmission region of the reflective optical system.
Figure 4:
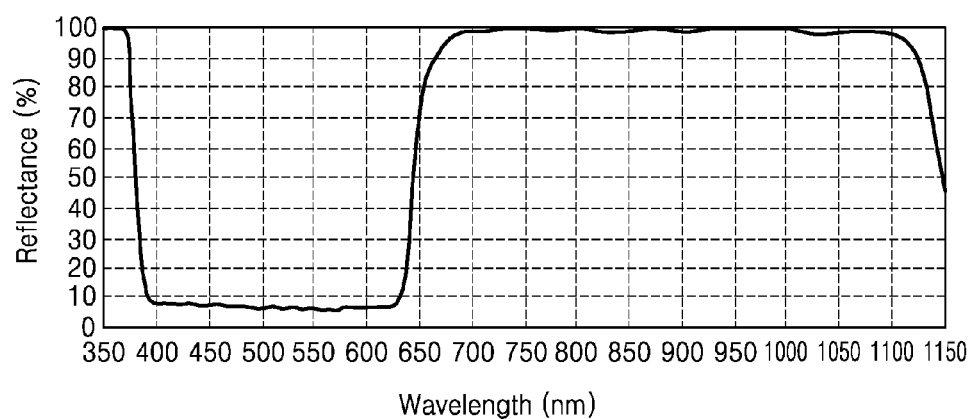
FIG. 4 is an exemplary graph of reflectance per wavelength of a reflection coating layer located in a reflection region of the reflective optical system.

For example, as shown in a graph of transmittance per wavelength of FIG. 3, the high transmission coating layer may transmit light in having a wavelength in a visible light range and block light having other wavelengths. Also, as shown in a graph of reflectance per wavelength of FIG. 4, the high reflection coating layer may reflect light having a wavelength in an infrared light range and absorb or transmit light having other wavelengths. Alternatively, the high transmission coating layer may transmit light having the wavelength in the infrared light range or a wavelength in an ultraviolet light range, and the high reflection coating layer may reflect light having the wavelength in the visible light range. For example, when the refractive optical system 110 uses visible light and the reflective optical system 120 uses infrared light to form images, the refractive optical system 110 may capture a usual color image, and the reflective optical system 120 may provide functions such as iris recognition, blood vessel recognition, subject distance estimation, infrared signal detection, infrared thermal imaging, and night vision.

Hereinafter, operations of the dual focus lens 100 according to the present embodiment will be described with reference to FIGS. 5 to 8.

Figure 5:
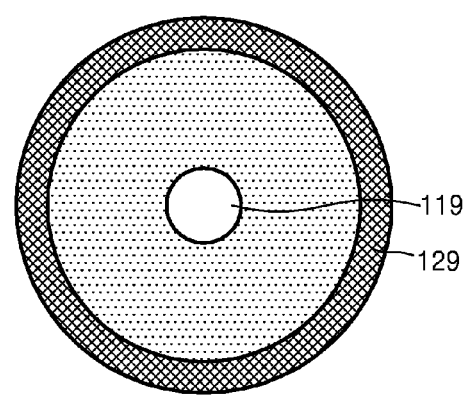
FIG. 5 is a view of the dual focus lens when a shutter of the refractive optical system is open, and a shutter of the reflective optical system is closed.
Figure 6:
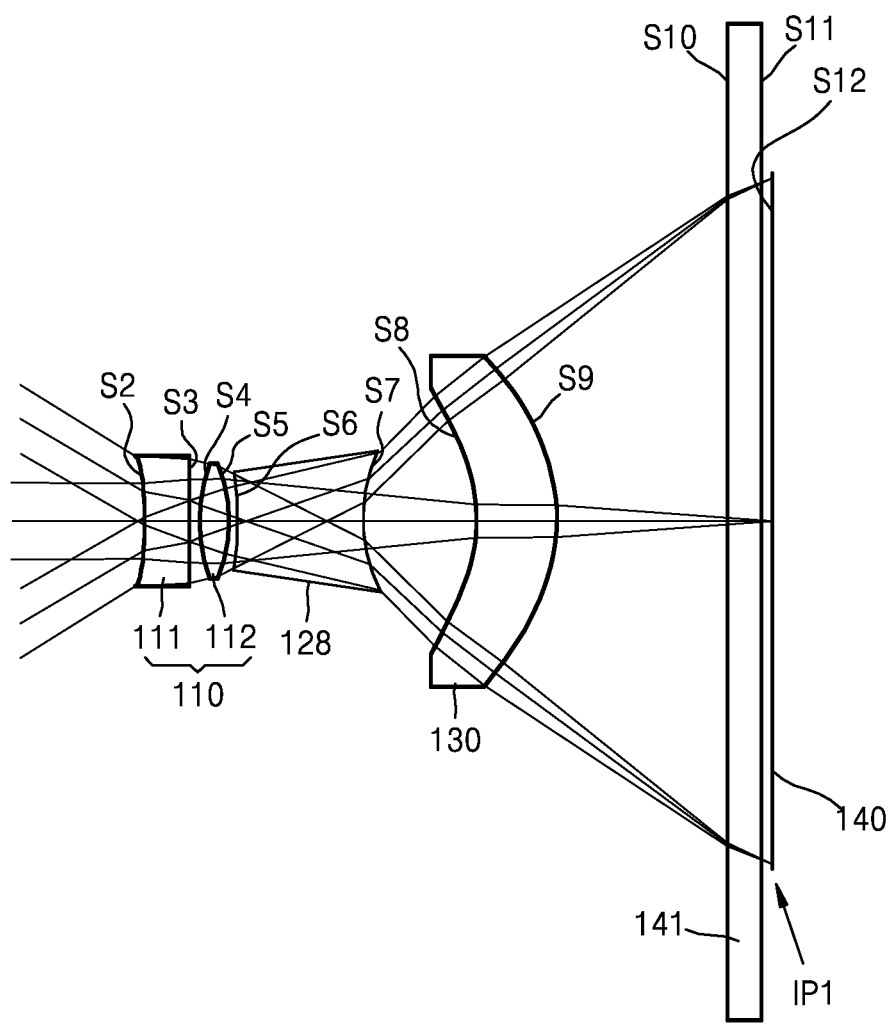
FIG. 6 is an exemplary view of a path of light incident on the dual focus lens in the case of FIG. 5.

FIG. 5 is a view of the dual focus lens 100 when the first shutter 119 of the refractive optical system 110 is open, and the second shutter 129 of the reflective optical system 120 is closed. FIG. 6 is an exemplary view of a path of light incident on the dual focus lens 100 in the case of FIG. 5. Only elements related to the refractive optical system 110 are illustrated in FIG. 6, and elements related to the reflective optical system 120 are omitted. As illustrated in FIG. 5, the first shutter 119, formed in a circular shape in the center, is open, and the second shutter 129, formed in a ring shape in a periphery region, is closed. In this case, light is incident only on the refractive optical system 110. Accordingly, only the refractive optical system 110 contributes to an image formed on the image sensor 140. Then, the image pickup apparatus may perform short distance photography. The image sensor 140 of the image pickup apparatus may be located at the first image plane IP1.

Figure 7:
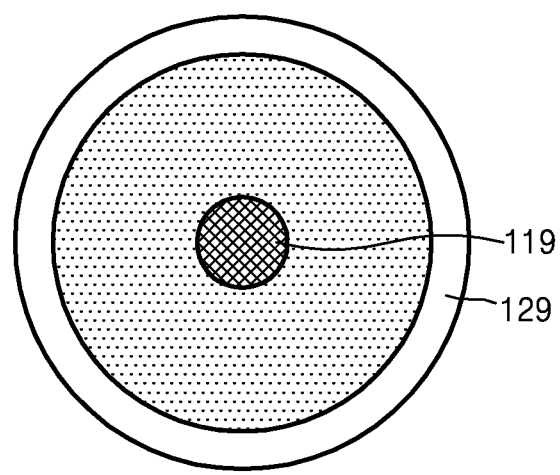
FIG. 7 is a view of the dual focus lens when the shutter of the refractive optical system is closed, and the shutter of the reflective optical system is open.
Figure 8:
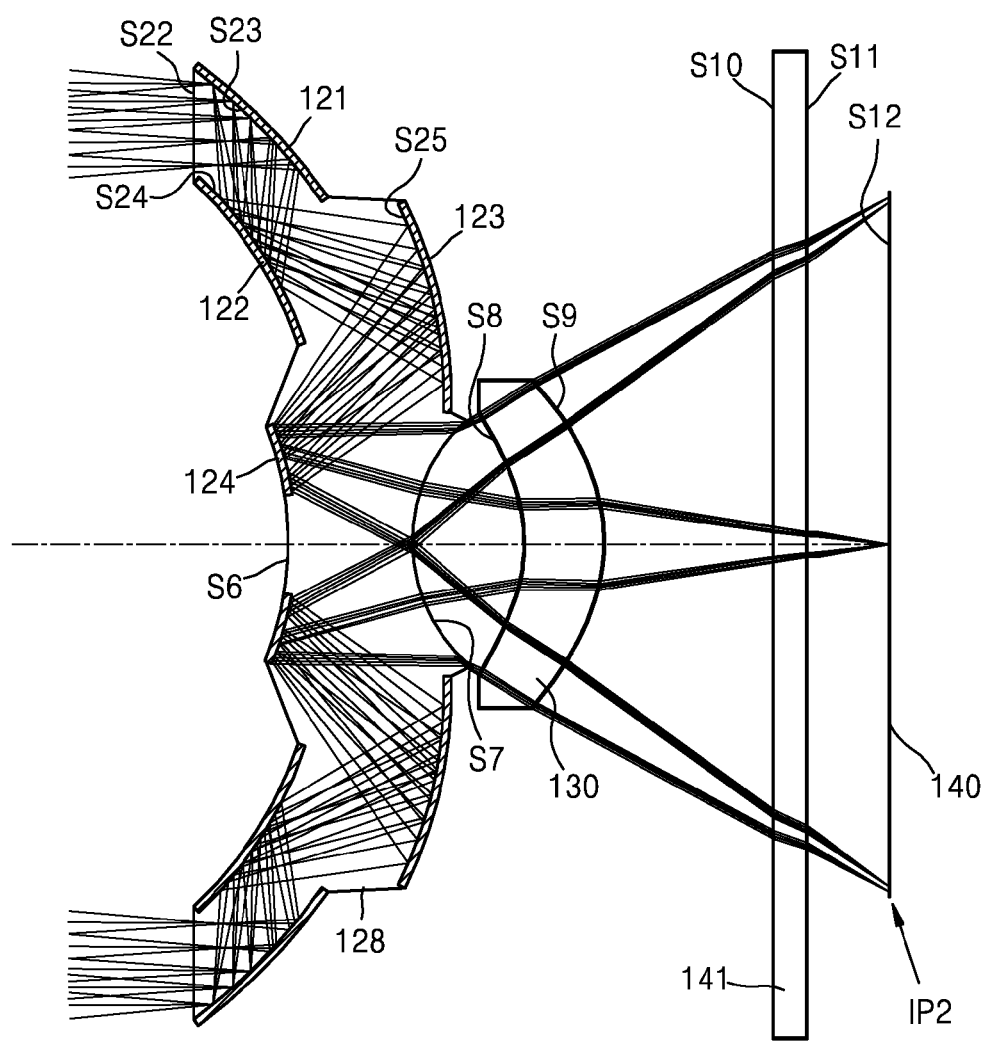
FIG. 8 is an exemplary view of a path of light incident on the dual focus lens in the case of FIG. 7.

FIG. 7 is a view of the dual focus lens 100 when the first shutter 119 of the refractive optical system 110 is closed, and the second shutter 129 of the reflective optical system 120 is open. FIG. 8 is an exemplary view of a path of light incident on the dual focus lens 100 in the case of FIG. 7. In FIG. 8, the elements related to the reflective optical system 120 are only illustrated, and the elements related to the refractive optical system 110 are omitted. As illustrated in FIG. 7, the first shutter 119, formed in a circular shape in the center, is closed, and the second shutter 129, formed in a ring shape in the periphery region, is open. In this case, light is incident only on the reflective optical system 120. Accordingly, only the reflective optical system 120 may contribute in forming of an image by the image sensor 140. Then, the image pickup apparatus may perform long distance photography. The image sensor 140 of the image pickup apparatus may be located at the second image plane IP2. Therefore, the image sensor 140 may move to the first image plane IP1 when the refractive optical system 110 is photographing, and may move to the second image plane IP2 when the reflective optical system 120 is photographing. However, according to embodiments, when the first and second image planes IP1 and IP2 are the same, the image sensor 140 may be fixed.

Figure 9:
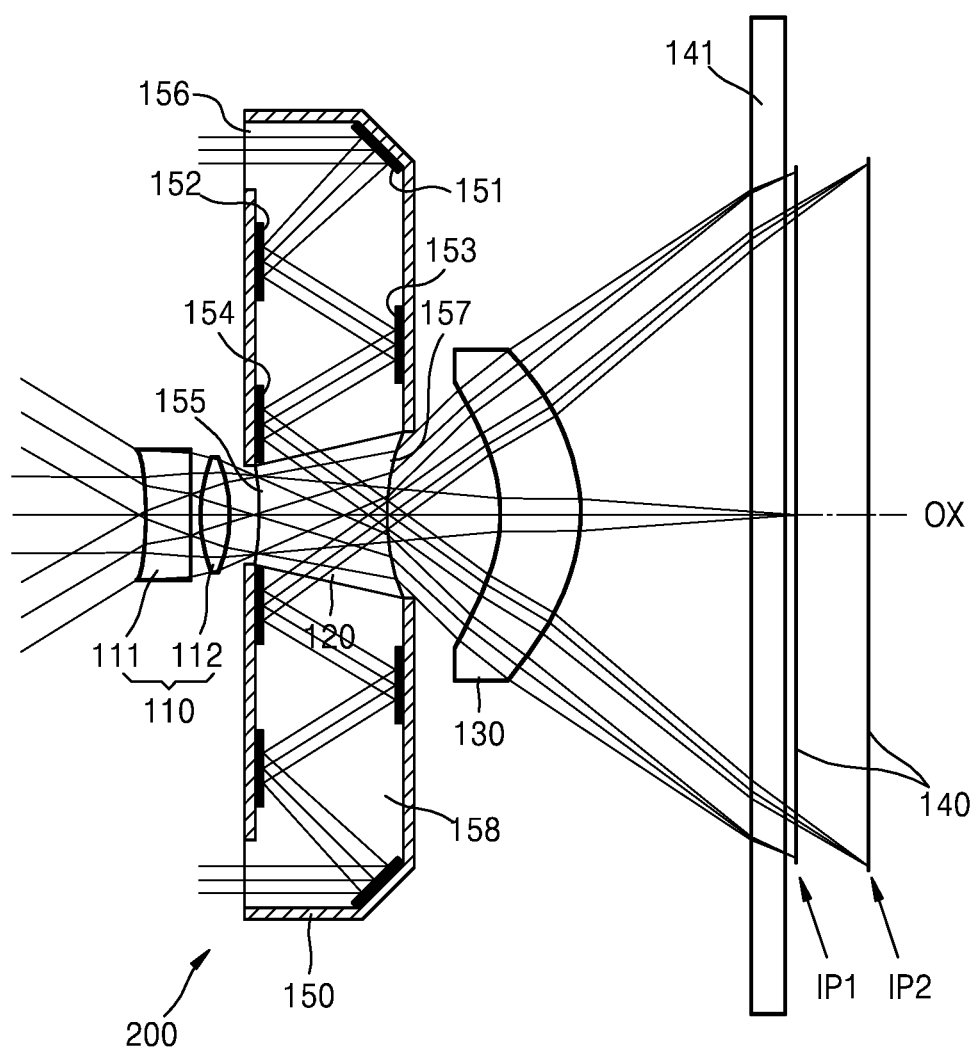
FIG. 9 is a schematic cross-sectional view of a dual focus lens and an image pickup apparatus including the dual focus lens, according to another example embodiment.

FIG. 9 is a schematic cross-sectional view of a dual focus lens 200 and an image pickup apparatus including the dual focus lens 200, according to another embodiment. Referring to FIG. 9, the dual focus lens 200 according to the present embodiment may include the refractive optical system 110 having a first focal length, and a reflective optical system 150 having a second focal length that is different from the first focal length. Unlike the dual focus lens 100 of FIG. 1, the reflective optical system 150 included in the dual focus lens 200 of FIG. 9 has a flat shape.

In the present embodiment, the reflective optical system 150 may include a first light incident region 155 on which light emitted from the refractive optical system 110 is incident, a light emission region 157 which emits light incident to the first light incident region 155 to the image side, a second light incident region 156 formed in a ring shape around a circumference of the reflective optical system 150, and first to fourth reflection surfaces 151 to 154 disposed between the first and second light incident regions 155 and 156 in a radius direction having the optical axis OX in the center. The first to fourth reflection surfaces 151 to 154 may be fixed onto a transparent substrate 158 that is flat. For example, the second and fourth reflection surfaces 152 and 154 may be located on a first surface of the transparent substrate 158, and the third reflection surface 153 may be located on a second surface of the transparent substrate 158. The first and second surfaces of the transparent substrate 158 are facing each other, and a perpendicular direction of the first and second surfaces may be in parallel with the optical axis OX. The first light incident region 155 and the light emission region 157 that are located in the center of the reflective optical system 150 may have curved surfaces. Also, the first reflection surface 151 facing the second light incident region 156 may be inclined so that light reflected by the first reflection surface 151 is inclined and thus proceeds to the second reflection surface 152.

The image sensor 140 may be divided into at least two separate segments, and at least one of the first and second shutters 119 and 129 may be divided into at least two separate segments that are independently driven. For example, FIGS. 10A to 10D are exemplary views of various divided image sensors 140 and FIGS. 11A to 11E are exemplary views of various operations of the first and second shutters 119 and 129.

Figure 10A:
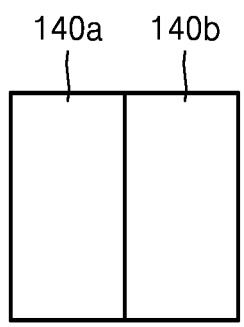
FIGS. 10A to 10D are exemplary views of various divided image sensors.
Figure 10B:
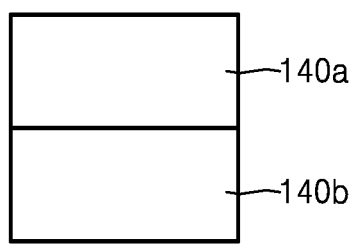
Figure 10C:
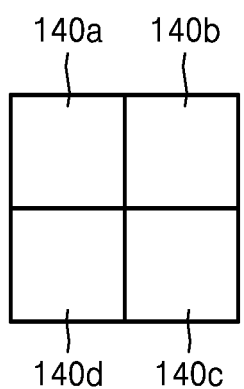

Referring to FIG. 10A, the image sensor 140 may include two segments 140a and 140b that are vertically divided. The segments 140a and 140b may be physically divided, or be logically divided by using the image signal processor of the image pickup apparatus. For example, the image signal processor may separately process signals that are generated from the segments 140a and 140b and thus form two images, or alternatively, merge and process the signals and thus form one image. Alternatively, as in FIG. 10B, the image sensor 140 may include two segments 140a and 140b that are horizontally divided. Alternatively, as in FIG. 10C, the image sensor 140 may include four segments 140a, 140b, 140c, and 140d that are vertically and horizontally divided.

When the image sensor 140 is divided into the segments 140a, 140b, 140c, and 140d, the image pickup apparatus may obtain stereo images having different parallaxes. For example, when the image sensor 140 is vertically divided, stereo images having parallaxes of a horizontal direction may be obtained; when the image sensor 140 is horizontally divided, stereo images having parallaxes of a vertical direction may be obtained; and when the image sensor 140 is horizontally and vertically divided, stereo images having parallaxes of the horizontal and vertical directions may be obtained.

Figure 11A:
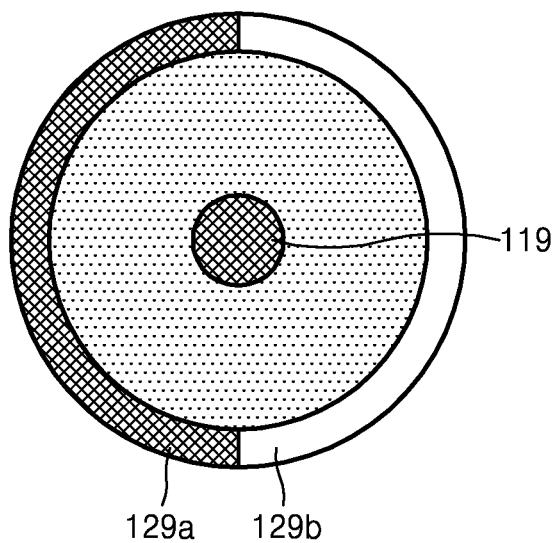
FIGS. 11A to 11E are exemplary views of various operations of a shutter.
Figure 11B:
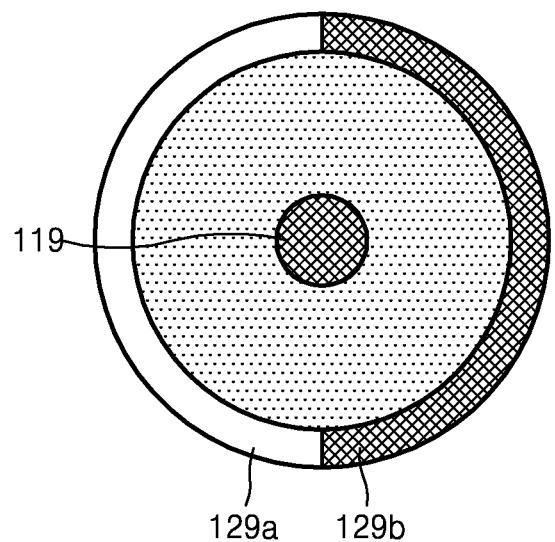
Figure 11C:
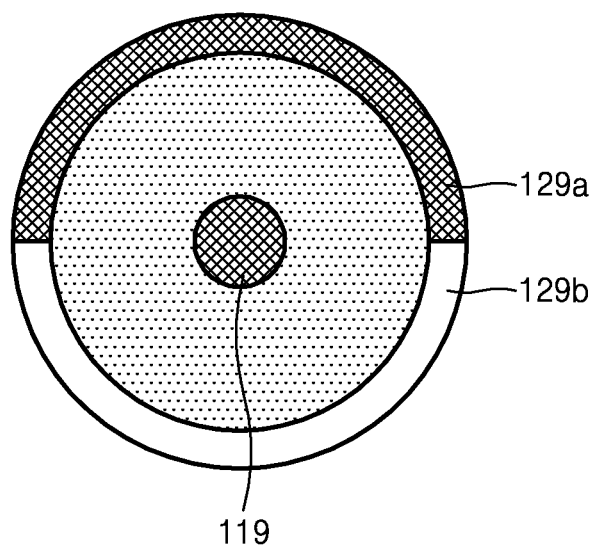
Figure 11D:
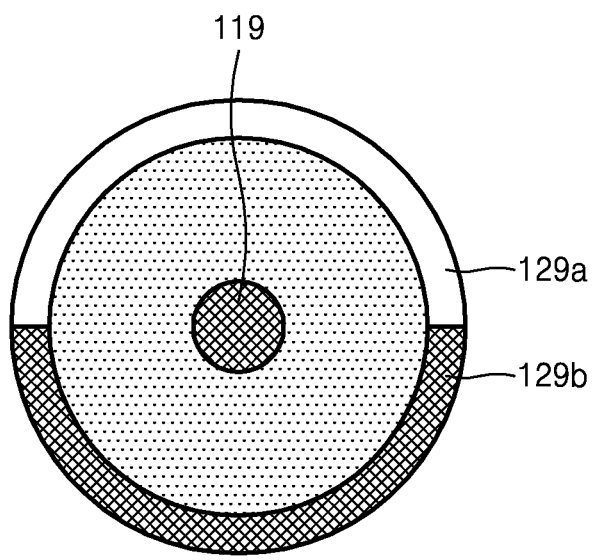

In order to obtain such stereo images, the reflective optical system 120 may be used by closing the first shutter 119 in the center and opening the second shutter 129 in the periphery region, as illustrated in FIG. 7. In this case, the image signal processor of the image pickup apparatus may separately process signals generated from the segments 140a, 140b, 140c, and 140d and thus generate a plurality of images. Alternatively, in order to obtain a usual image, the refractive optical system 110 may be used by opening the first shutter 119 and closing the second shutter 129, as illustrated in FIG. 5. In this case, the image signal processor of the image pickup apparatus may merge and process the signals generated from the segments 140a, 140b, 140c, and 140d and thus form one image At least one of the first and second shutters 119 and 129 may be divided into at least two segments that are independently driven in a circumference direction. For example, the second shutter 129 may be vertically divided into two segments 129a and 129b as illustrated in FIGS. 11A and 11B, or be horizontally divided into the segments 129a and 129b as illustrated in FIGS. 11C and 11D. When the second shutter 129 is divided into the segments 129a and 129b, while the first shutter 119 in the center is closed, the segments 129a and 129b of the second shutter 129 may be operated such that one is open and the other is closed. As illustrated in FIG. 5, while the first shutter 119 is open, the segments 129a and 129b of the second shutter 129 may both be closed.

Figure 10D:
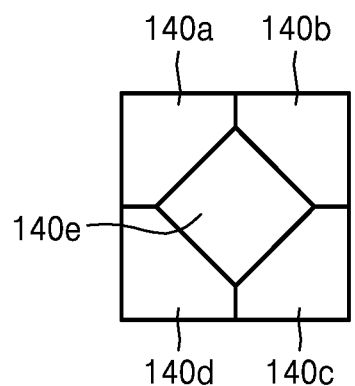
Figure 11E:
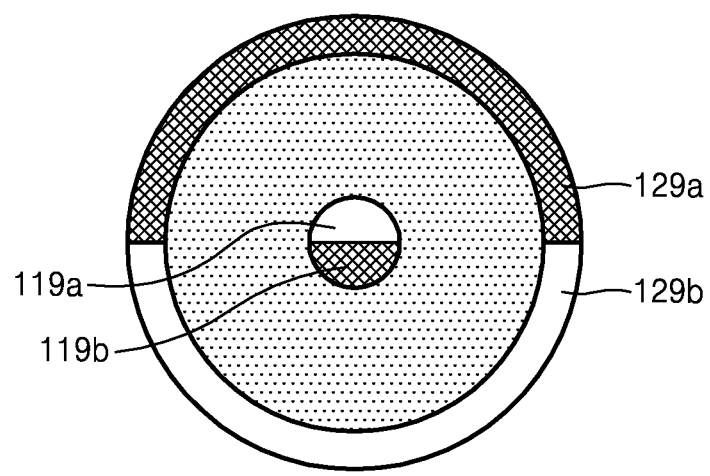

Alternatively, referring to FIG. 10D, the image sensor 140 may be divided into five segments 140a, 140b, 140c, 140d, and 140e. For example, the image sensor 140 may include the segments 140a, 140b, 140c, 140d, and 140e at the top, the bottom, the right, the left, and the center. In this case, the image pickup apparatus may obtain not only stereo images by using the reflective optical system 120, but also wide angle images by using the refractive optical system 110. Therefore, as illustrated in FIG. 11E, the first and second shutters 119 and 129 may both be horizontally divided into upper and lower segments 119a, 119b, 129a, and 129b. The segments 119a and 119b of the first shutter 119 and the segments 129a and 129b of the second shutter 129 may open in an opposite direction. For example, the upper segment 119a of the first shutter 119 and the lower segment 129b of the second shutter 129 may open simultaneously. Alternatively, the lower segment 119b of the first shutter 119 and the upper segment 129a of the second shutter 129 may open simultaneously. Although FIG. 11E illustrates that the first and second shutters 119 and 129 are both horizontally divided, the present embodiment is not limited thereto, and the first and second shutters 119 and 129 may be vertically divided.

The dual focus lens 100 having the structure illustrated in FIG. 1 is manufactured according to a first embodiment. FIG. 12 is a table of specific optical data of the refractive optical system 110 of the dual focus lens 100, according to the first embodiment. In FIG. 12, surfaces S0 and S1 indicate both surfaces of the first shutter 119. Surfaces S2 to S12 are shown in FIG. 6. For example, the surfaces S2 and S3 indicate both surfaces of the first refractive lens element 111, the surfaces S4 and S5 indicate both surfaces of the second refractive lens element 112, the surfaces S6 and S7 respectively indicate the first light incident region 125 and the light emission region 127, the surfaces S8 and S9 indicate both surfaces of the common lens element 130, the surfaces S10 and S11 indicate both surfaces of the cover layer 141, and the surface S12 indicate a surface of the image sensor 140.

As shown in FIG. 12, the first refractive lens element 111 is a meniscus lens having a negative refractive power that includes a concave surface facing the object side and a convex surface facing the image side. The second refractive lens element 112 is a biconvex lens. The first light incident region 125 and the light emission region 127 both have concave surfaces. Also, the common lens element 130 is a meniscus lens having a negative refractive power that includes a concave surface facing the object side and a convex surface facing the image side.

The surfaces S2 to S9 are aspheric surfaces. FIG. 13 is a table of aspheric coefficients of the aspheric surfaces of the refractive optical system 110 of the dual focus lens 100 according to the first embodiment. The aspheric coefficients may satisfy Equation 1.

$$Z(r) = \frac{cr^2}{1 + \sqrt{1-(1+k)c^2r^2}} + Ar^4 + Br^6 + Cr^8 + Dr^{10} + Er^{12} + Fr^{14} + Gr^{16} + Hr^{18} + Jr^{20} \qquad <\text{Equation 1}>$$

In the refractive optical system 110 of the dual focus lens 100 according to the first embodiment, an effective focus length (EFL) is 5.967 mm, and an entrance pupil diameter (EPD) is 0.88 mm, and an f-number is 6.7.

FIG. 14 is a table of specific optical data of the reflective optical system 120 of the dual focus lens 100, according to the first embodiment. In FIG. 14, surfaces S20 and S21 indicate both surfaces of the second shutter 129. Surfaces S22 to S25 and surfaces S6 to S12 are shown in FIG. 8. For example, the surface S22 indicates the second light incident region 126, and the surfaces S23 to S25 respectively indicate the first to third reflection surfaces 121, 122, and 123. The surfaces S6 to S12 are common surfaces of the refractive and reflective optical systems 110 and 120. The fourth reflection surface 124 is formed on the surface S6. As shown in FIG. 14, the surfaces S23 to S25 and the surfaces S6 to S9 are aspheric surfaces. FIG. 15 is a table of aspheric coefficients of the aspheric surfaces of the reflective optical system 120 of the dual focus lens 100 according to the first embodiment. Since the aspheric coefficients of the surfaces S6 to S9 are already shown in FIG. 13, detailed description thereof will be omitted.

As shown in FIG. 14, the transparent substrate 128 and the common lens element 130 may be formed of different materials so as to suppress chromatic aberration of the dual focus lens 100. In FIG. 14, the transparent substrate 128 is formed by using PMMA, and the common lens element 130 is formed by using glass having a refractive index of 1.744992, and dispersive power of 42.404%.

FIG. 16 is a table of effective external and internal diameters of the second light incident region 126 and the first to third reflection surfaces 121 to 123 of the reflective optical system 120 of the dual focus lens 100, according to the first embodiment. The effective external and internal diameters shown in the table of FIG. 16 are determined with respect to a distance from the optical axis OX. The values of FIG. 16 are shown in "mm."

In the reflective optical system 120 of the dual focus lens 100 according to the first embodiment, an EFL is 27.65 mm, an EPD is 10.64 mm, and an f-number is 2.6.

Figure 17:
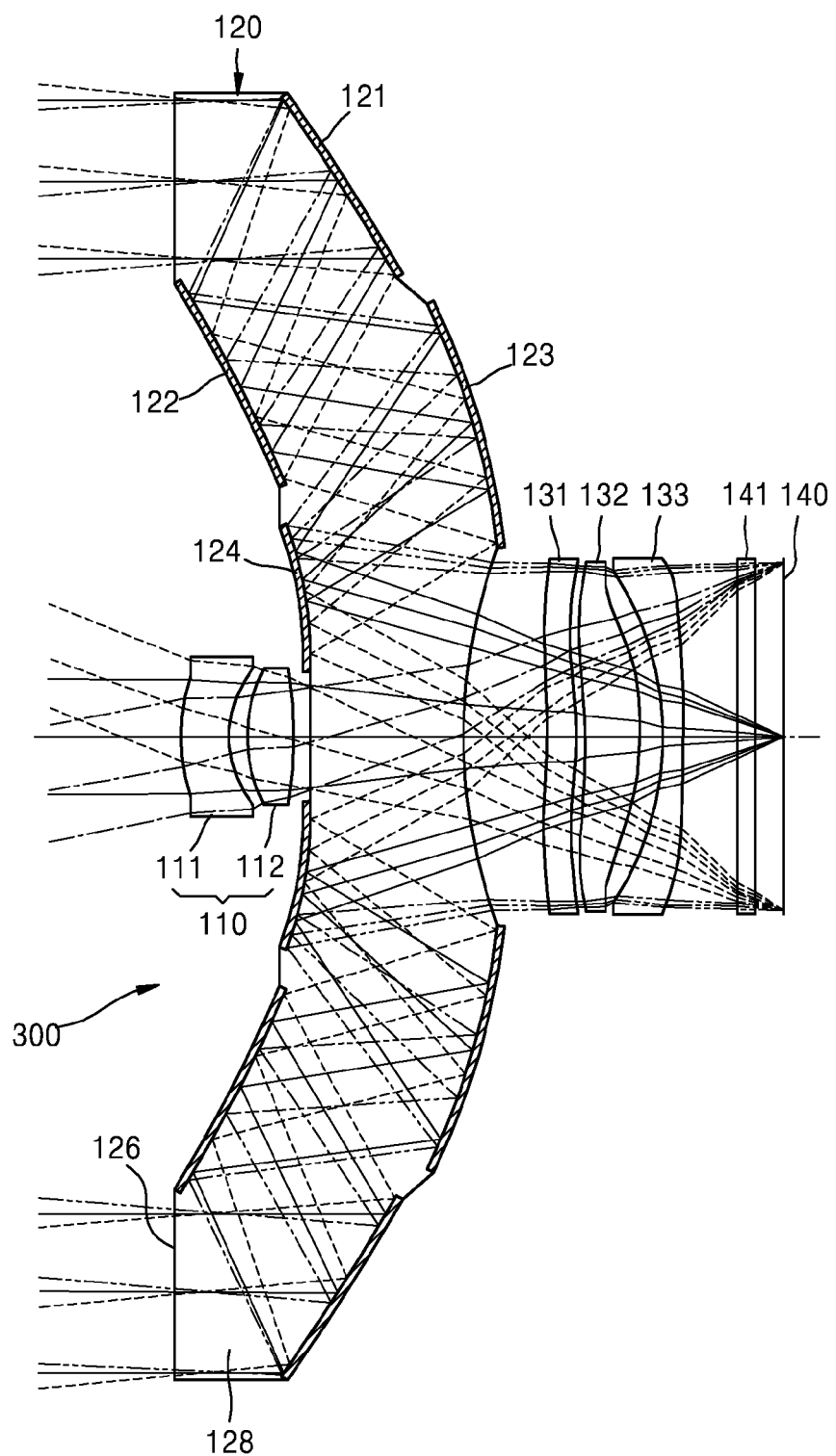
FIG. 17 is a schematic cross-sectional view of a dual focus lens, according to a second embodiment.

FIG. 17 is a schematic cross-sectional view of a dual focus lens 300, according to a second embodiment. The dual focus lens 300 according to the second embodiment includes the refractive optical system 110 having a first focal length, the reflective optical system 120 having a second focal length that is different from the first focal length, and first to third common lens elements 131, 132, and 133. Difference between the first and second embodiments is in that the dual focus lens 300 according to the second embodiment includes the first to third common lens elements 131, 132, and 133, and image planes of the refractive and reflective optical systems 110 and 120 are the same.

Figure 18:
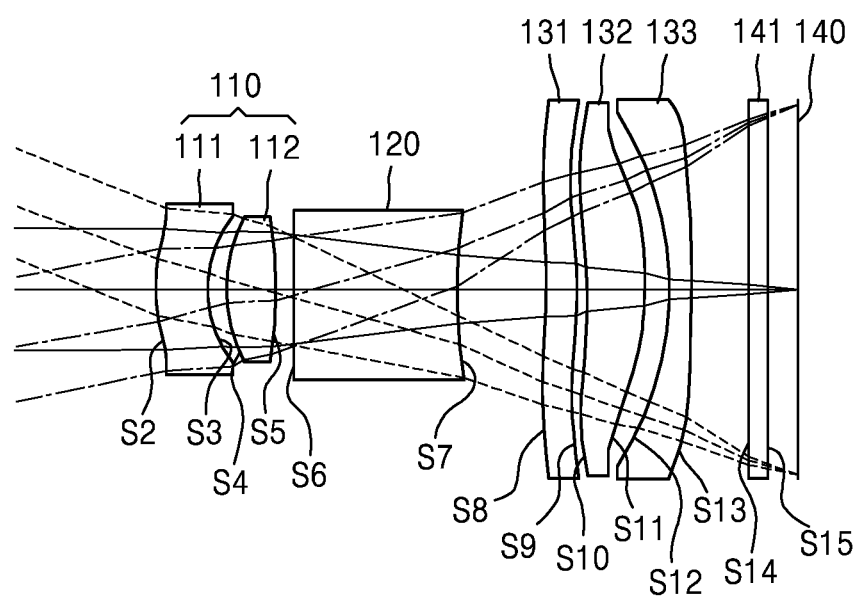
FIG. 18 is a cross-sectional view of a refractive optical system of the dual focus lens, according to the second embodiment.

FIG. 18 is a cross-sectional view of the refractive optical system 110 of the dual focus lens 300, according to the second embodiment. FIG. 19 is a table of specific optical data of the refractive optical system 110 of the dual focus lens 300, according to the second embodiment. In the table of FIG. 19, surfaces S0 and S1 indicate both surfaces of the first shutter 119. Surfaces S2 to S15 are shown in FIG. 18. For example, the surfaces S2 and S3 indicate both surfaces of the first refractive lens element 111, the surface S4 and S5 indicate both surfaces of the second refractive lens element 112, the surfaces S6 and S7 respectively indicate the first light incident region 125 and the light emission region 127, the surfaces S8 and S9 indicate both surfaces of the first common lens element 131, the surfaces S10 and S11 indicate both surfaces of the second common lens element 132, the surfaces S12 and S13 indicate both surfaces of the third common lens element 133, and the surfaces S14 and S15 indicate both surfaces of the cover layer 141.

As shown in FIG. 19, the first refractive lens element 111 is a meniscus lens having a negative refractive power that includes a convex surface facing the object side and a concave surface facing the image side. The second refractive lens element 112 is a biconvex lens. The first light incident region 125 and the light emission region 127 both have concave surfaces. The first and second common lens elements 131 and 132 are meniscus lenses having a positive refractive power that includes a concave surface facing the object side and a convex surface facing the image side. Also, the third common lens element 133 is a meniscus lens having a negative refractive power that includes a concave surface facing the object side and a convex surface facing the image side.

The surfaces S2 to S13 are aspheric surfaces. FIG. 20 is a table of aspheric coefficients of the aspheric surfaces of the refractive optical system 110 of the dual focus lens 300, according to the second embodiment. The aspheric coefficients may satisfy Equation 1.

In the refractive optical system 110 of the dual focus lens 300 according to the second embodiment, an EFL is 8 mm, an EPD is 2.3 mm, and an f-number is 3.4.

Figure 21:
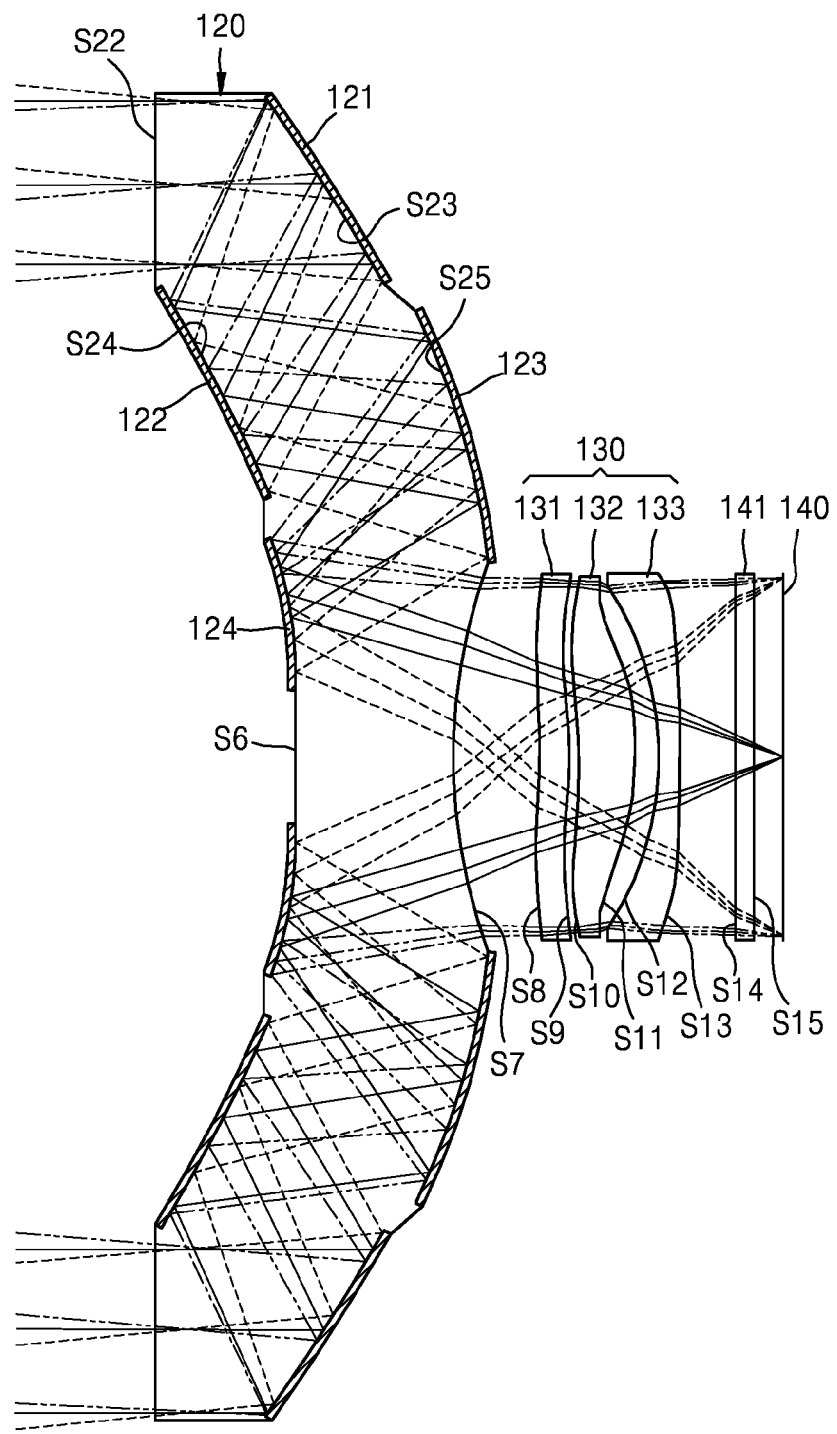
FIG. 21 is a cross-sectional view of a reflective optical system of the dual focus lens, according to the second embodiment.

FIG. 21 is a cross-sectional view of the reflective optical system 120 of the dual focus lens 300, according to the second embodiment. FIG. 22 is a table of specific optical data of the reflective optical system 120 of the dual focus lens 300, according to the second embodiment. In the table of FIG. 22, surfaces S20 and S21 indicate both surfaces of the second shutter 129. Surfaces S22 to S25 and surfaces S6 to S15 are shown in FIG. 21. For example, the surface S22 indicates the second light incident region 126, and the surfaces S23 to S25 respectively indicate the first to third reflection surfaces 121, 122, and 123. The surfaces S6 to S15 are common surfaces of the refractive and reflective optical systems 110 and 120. The fourth reflection surface 124 is formed on the surface S6. As shown in FIG. 22, the surfaces S23 to S25 and the surfaces S6 to S13 are aspheric surfaces. FIG. 23 is a table of aspheric coefficients of the aspheric surfaces of the reflective optical system 120 of the dual focus lens 300 according to the second embodiment. Since the aspheric coefficients of the surfaces S6 to S13 are already shown in FIG. 20, detailed description thereof will be omitted.

As shown in FIGS. 19 and 22, the first and second refractive lens elements 111 and 112, the transparent substrate 128, and the first to third common lens elements 131, 132, and 133 may be formed of different materials so as to suppress chromatic aberration of the dual focus lens 300. In FIGS. 19 and 22, the first refractive lens element 111 is formed by using a glass material having a refractive index of 1.65 and a dispersive power of 33.44%, the second refractive lens element 112 is formed by using a glass material having a refractive index of 1.67 and a dispersive power of 52.27%, the transparent substrate 128 is formed by using PMMA, the first and third common lens elements 131 and 133 are formed by using polycarbonate (PC), and the second common lens element 132 is formed by using PMMA. However, the present embodiment is not limited to the description above, and various materials may be used according to the designs of the dual focus lens 300.

FIG. 24 is a table of effective external and internal diameters of the first to third reflection surfaces 121, 122, and 123 of the reflective optical system 120 of the dual focus lens 300, according to the second embodiment. The values of FIG. 24 are shown in "mm."

In the reflective optical system 120 of the dual focus lens 300 according to the second embodiment, an EFL is 25.2 mm, an EPD is 22 mm, and an f-number is 1.1.

In general, the image pickup apparatus may use an illumination light to photograph in dark places or estimate distance. However, using the illumination light may increase a volume of the image pickup apparatus. Since there is a space between the refractive optical system 110 and the reflective optical systems 120 and 150 in the dual focus lenses 100, 200, and 300 according to the above-described embodiments, it is possible to save an internal space of the image pickup apparatus by arranging a light source in the space between the refractive optical system 110 and the reflective optical systems 120 and 150.

Figure 25:
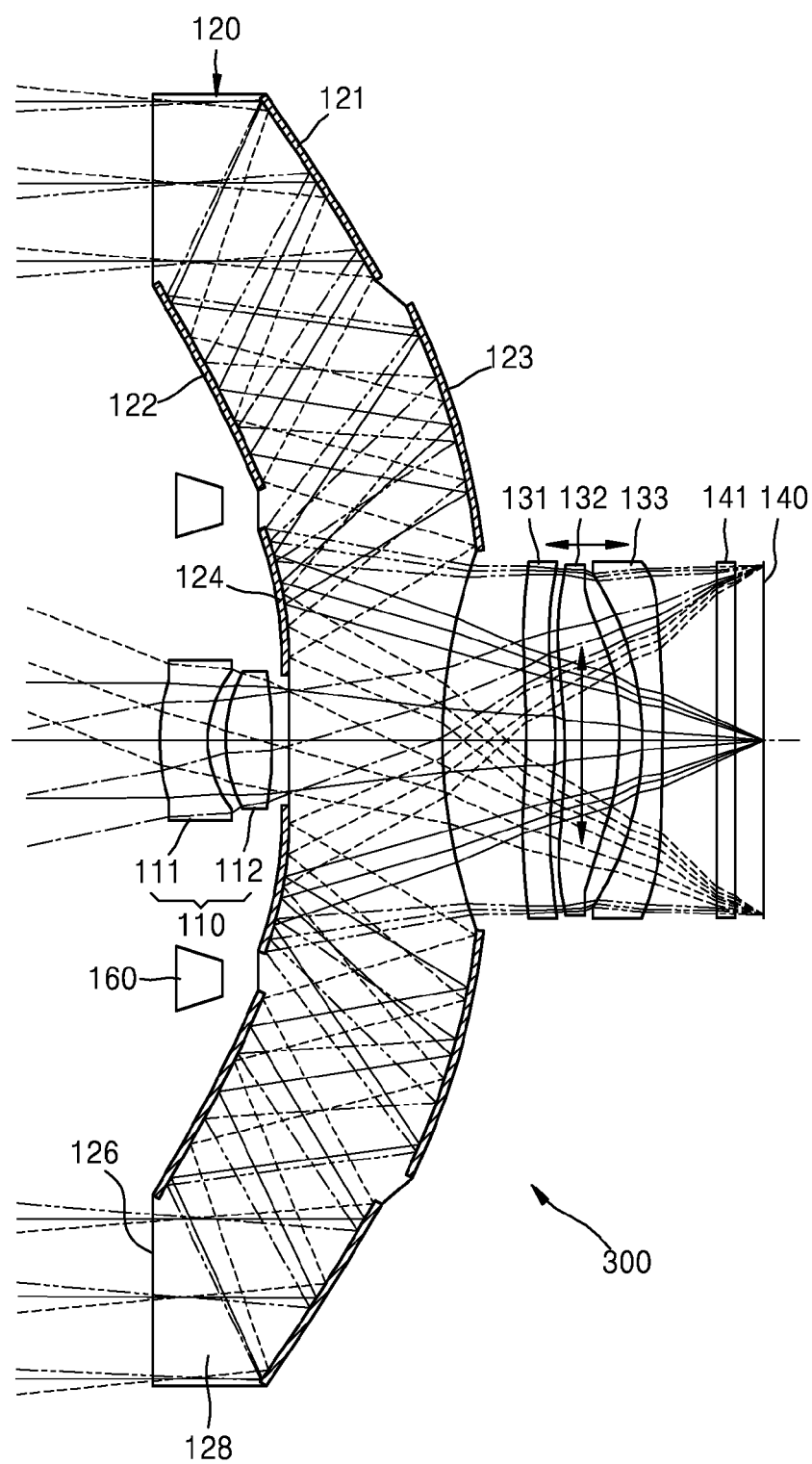
FIG. 25 is a schematic cross-sectional view of a dual focus lens and an image pickup apparatus including the dual focus lens, according to another embodiment.

FIG. 25 is a schematic cross-sectional view of a dual focus lens 300' and an image pickup apparatus including the dual focus lens, according to another embodiment. Referring to FIG. 25, the dual focus lens 300' may additionally include a light source 160 that is located in a space between the refractive and reflective optical systems 110 and 120 in a direction perpendicular to the optical axis OX in which the space surrounds the refractive optical system 110. The light source 160 may be, for example, a light-emitting diode (LED). The light source 160 may be a linear light source that is formed in a ring shape and located having the optical axis OX in the center. Alternatively, one or more light sources 160 may be located around a circumference of the refractive optical system 110. FIG. 25 illustrates an example in which the light source 160 is located in the dual focus lens 300 of FIG. 17. However, the present embodiment is not limited thereto, and the light source 160 may be located around the refractive optical system 110 of the dual focus lenses 100 and 200 respectively illustrated in FIGS. 1 and 9.

Since the reflective optical system 120 has a long focal length, the reflective optical system 120 may be sensitive to vibrations. In order to compensate the vibrations, at least one of the common lens elements 131, 132, and 133, which are located between the reflective optical system 120 and the image sensor 140, or the image sensor 140 may be driven in a direction perpendicular to the optical axis OX. For example, any one of the common lens elements 131, 132, and 133, or all of the common lens elements 131, 132, and 133, or the image sensor 140 may be driven in a direction perpendicular to the optical axis OX to compensate the vibrations. The common lens element 130 illustrated in FIGS. 1 and 9 may also be driven in the direction perpendicular to the optical axis OX.

When a location of an object is changed (i.e., when a distance between the object and the image pickup apparatus is changed), at least one of the common lens elements 131, 132, and 133, or the image sensor 140 may be driven in a direction of the optical axis OX so as to control focus. For example, in order to accurately form an image of the object in the image sensor 140, any one of the common lens elements 131, 132, and 133 or all of the common lens elements 131, 132, and 133 may be driven in the direction of the optical axis OX. Alternatively, the image sensor 140 may be driven in the direction of the optical axis OX. The common lens element 130 illustrated in FIGS. 1 and 9 may also be driven in the direction of the optical axis OX.

It is possible to integrate mechanisms for moving the common lens elements 130, 131, 132, and 133 or the image sensor 140 in the direction of the optical axis OX or the direction perpendicular to the optical axis OX. In other words, the common lens elements 130, 131, 132, and 133 or the image sensor 140 may all be designed such that they move to the direction of the optical axis OX or the direction perpendicular to the optical axis OX.

So far, the refractive optical system 110 and the reflective optical systems 120 and 150 of the dual focus lenses 100, 200, 300, and 300' are described as having a fixed magnification. However, depending on the design, any one or all of the refractive optical system 110 and the reflective optical systems 120 and 150 may be configured to perform a zoom function with variable magnification. For example, the refractive optical system 110 may be designed such that the first and second lens elements 111 and 112 are used to perform a zoom function, or such that the common lens elements 130, 131, 132, and 133 and the first and second refractive lens elements 111 and 112 of the refractive optical system 110 are used together to perform the zoom function. Also, the refractive optical system 110 may include additional lens elements other than the lens elements 111 and 112 to perform the zoom function.

The reflective optical system 120 of FIGS. 1 and 17 may be configured such that distances between the first to fourth reflection surfaces 121 to 124 are variable, or designed such that the distances between the first to fourth reflection surfaces 121 to 124 are variable and the first to third common lens elements 131, 132, and 133 are used to perform the zoom function. The reflective optical system 150 of FIG. 9 may be configured such that at least one selected from the first to fourth reflection surfaces 151 to 154 is a deformable mirror. The deformable mirror is a mirror having a variable curvature so that a focal length may be changed, and may be modified into various forms by mechanical or electrical manipulation. For example, the deformable mirror may include a flexible reflection surface formed of a flexible material, and a plurality of electrical or mechanical fine actuators that are 2-dimensionally arrayed to locally push or pull the flexible reflection surface and thus modify a form thereof. Also, the first to fourth reflection surfaces 121 to 124 of the reflective optical system 120 of FIGS. 1 and 17 may be deformable mirrors.

Figure 26:
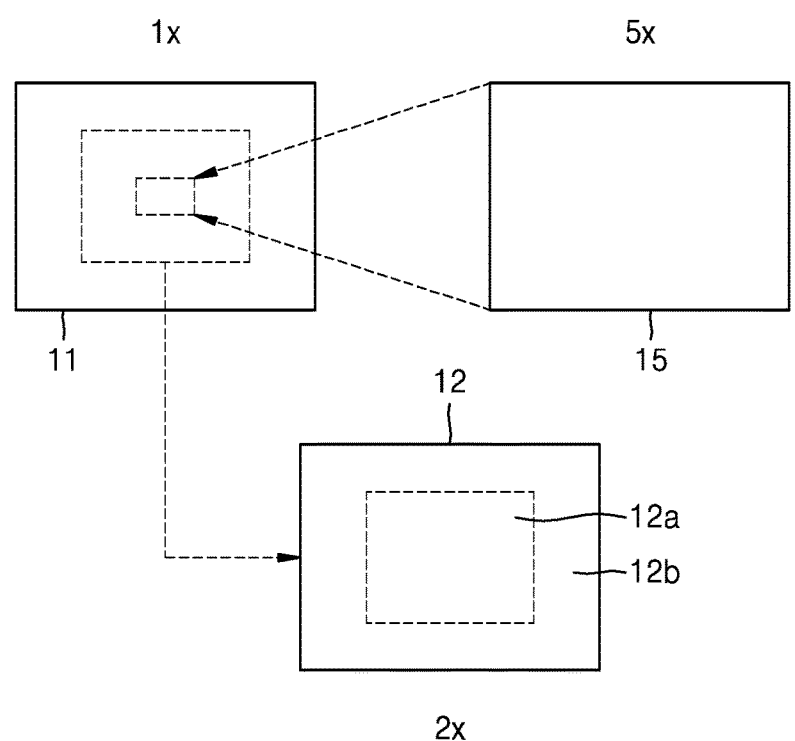
FIGS. 26 and 27 are conceptual views describing a principle of a digital zoom function by using two images respectively obtained from a refractive optical system and a reflective optical system of a dual focus lens.
Figure 27:
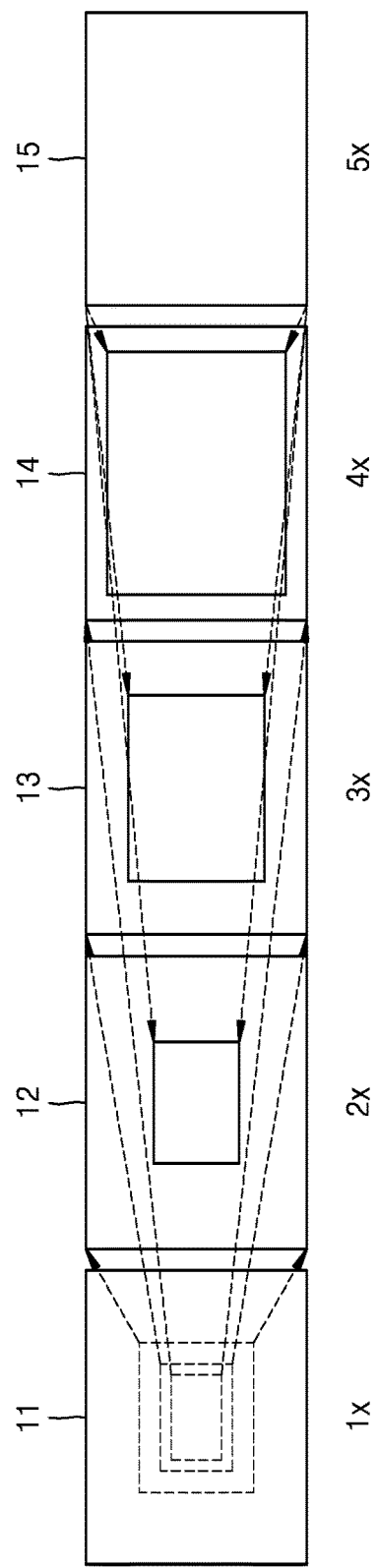

A digital zoom function may be implemented by using two images obtained from the refractive optical system 110 and the reflective optical systems 120 and 150 of the dual focus lenses 100, 200, 300, and 300'. In other words, if respective magnifications between a wide angle position of the refractive optical system 110 and telephoto positions of the reflective optical systems 120 and 150 are obtained by digitally zooming using an image signal processor (not shown) of the image pickup apparatus, it is possible to continuously zoom from the wide angle position to the telephoto position. FIGS. 26 and 27 are conceptual views describing a principle of a digital zoom function by using two images obtained from the refractive optical system 110 and the reflective optical systems 120 and 150 of the dual focus lenses 100, 200, 300, and 300'.

Referring to FIG. 26, it is supposed that the refractive optical system 110 forms, for example, a 1× zoom image 11, and the reflective optical systems 120 and 150 form, for example, a 5× zoom image 15. A 2× zoom image 12 may be obtained by cropping and then digitally magnifying a central portion of the 1× zoom image 11 obtained from the refractive optical system 110. If only the central portion of the 1× zoom image 11 is magnified, an overall image quality of the 2× zoom image 12 may decrease. Therefore, the 5× zoom image 15 obtained from the reflective optical systems 120 and 150 is reduced, and a viewing angle area corresponding to a central portion 12a of the 2× zoom image 12 is replaced with a reduced version of the 5× zoom image 15. As a result, the central portion 12a of the 2× zoom image 12 may be obtained by reducing the 5× zoom image 15 and a surrounding portion 12b may be obtained by magnifying the 1× zoom image 11. Then, since at least an image quality of the central portion 12a of the 2× zoom image 12 did not decrease, the digital zoom function may be implemented according to the present embodiment while reducing image quality deterioration.

According to this method, as illustrated in FIG. 27, a 3× zoom image 13 or a 4× zoom image 14 may be obtained by combining an image obtained by cropping and magnifying the central portion of the 1× zoom image 11 obtained from the refractive optical system 110, and an image obtained by shrinking the 5× zoom image 15 obtained from the reflective optical systems 120 and 150. Alternatively, in addition to zoom images obtained by zooming according to integer multiples, i.e., 2×, 3×, and 4×, it is possible to form a zoom image at any magnification. Also, a central portion of the 5× zoom image 15 may be cropped and magnified to obtain a zoom image of greater than a 5× zoom level. A 10× zoom image that is obtained by digitally zooming using a general image pickup apparatus may have a very low image quality. However, according to the present embodiment, since the 5× zoom image 15 is magnified, the quality of the 10× zoom image is not greatly decreased. Also, an overall clarity of the 1× zoom image 11 may be improved by replacing the central portion of the 1× zoom image 11 which corresponds to a viewing angle of the 5× zoom image 15 with the 5× zoom image 15, or by correcting the 1× zoom image 11 with reference to the 5× zoom image 15.

There are a few aspects to regard when synthesizing the 1× zoom image 11 and the 5× zoom image 15. For example, since the refractive optical system 110 and the reflective optical systems 120 and 150 have different optical properties, e.g., aberration and brightness, the 1× zoom image 11 and the 5× zoom image 15 may have different degrees of distortion, aberration, and brightness. Accordingly, a central portion and a surrounding portion of a synthesized image may have different degrees of distortion, aberration, and brightness. Also, since the 1× zoom image 11 is magnified and the 5× zoom image 15 is reduced, the respective resolutions of the central portion and the surrounding portion of the synthesized image may be different from each other. Therefore, image processing may be performed such that the central portion and the surrounding portion of the synthesized image are smoothly connected to each other.

In performing the above image processing, based on information regarding degrees of distortion, aberration, brightness, and resolution of the 1× zoom image 11 and the 5× zoom image 15 which are obtained from the optical properties of the refractive optical system 110 and the reflective optical systems 120 and 150, an image to be synthesized may be corrected by using interpolation methods so that a central portion and a surrounding portion of the image to be synthesized may be smoothly corrected. For example, in order to obtain the 2× zoom image 12 by synthesizing the 1× zoom image 11 and the 5× zoom image 15, first, a brightness ratio between a central portion and a surrounding portion of the 1× zoom image 11 and a brightness ratio between a central portion and a surrounding portion of the 5× zoom image 15 are calculated. Next, a brightness ratio between a central portion and a surrounding portion of the 2× zoom image 12 is determined with reference to the two brightness ratios of the 1× zoom image 11 and the 5× zoom image 15. Then, when generating the 2× zoom image 12 by synthesizing, image processing may be performed such that a brightness of the reduced 5× zoom image 15 that is to be located in the central portion of the 2× zoom image 12 and a brightness of the cropped and magnified 1× zoom image 11 that is to be located in the surrounding portion of the 2× zoom image 12 is equal to the determined brightness ratio. The image processing may also be performed with respect to a degree of distortion, aberration, and resolution of the image to be synthesized by following methods similar to the above-described method.

It should be understood that the embodiments described herein should be considered in a descriptive sense only and not for purposes of limitation. Descriptions of features or aspects within each embodiment should typically be considered as available for other similar features or aspects in other embodiments. While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. A dual focus lens comprising:
   a refractive optical system having a first focal length, the refractive optical system comprising at least one refractive lens element;
   a reflective optical system having a second focal length that is different from the first focal length, the reflective optical system comprising a plurality of reflection surfaces; and
   a transparent substrate, the plurality of reflection surfaces being fixed onto a plurality of surfaces of the transparent substrate, respectively,
   wherein the refractive optical system and the reflective optical system respectively have a first image plane and a second image plane,
   the refractive optical system and the reflective optical system are both located at an object side with respect to the first and second image planes, the refractive optical system and the reflective optical system are located having a common optical axis in a center of the refractive optical system and a center of the reflective optical system, wherein the reflective optical system comprises a first light incident region formed on the center of the reflective optical system, and a second light incident region formed on an outer circumference of the refractive optical system in a ring shape, and wherein a first coating layer is provided on the first light incident region, the first coating layer transmitting light having a first wavelength and blocking light having wavelengths other than the first wavelength, and a second coating layer is provided on at least one of the plurality of reflection surfaces, the second coating layer reflecting light having a second wavelength which is different from the first wavelength and absorbing or transmitting light having wavelengths other than the second wavelength.

2. The dual focus lens of claim 1, wherein the refractive optical system is located at the object side with respect to the reflective optical system and the reflective optical system is located at an image side with respect to the refractive optical system, and wherein light emitted from the refractive optical system is incident on the first light incident region of the reflective optical system, and the reflective optical system further comprises a light emission region which emits light incident on the first light incident region to the image side, and wherein the first light incident region and the light emission region are formed on the plurality of surfaces of the transparent substrate.

3. The dual focus lens of claim 2, further comprising at least one common lens element located at the image side with respect to the refractive optical system and the reflective optical system, the at least one common lens element focusing light emitted from the refractive optical system on the first image plane and light emitted from the reflective optical system on the second image plane.

4. The dual focus lens of claim 3, wherein the at least one common lens element is designed to be movable along the common optical axis or in a direction perpendicular to the common optical axis.

5. The dual focus lens of claim 2, wherein respective locations of the first and second image planes along the common optical axis are the same.

6. The dual focus lens of claim 2, wherein respective locations of the first and second image planes along the common optical axis are different.

7. The dual focus lens of claim 2, wherein the reflective optical system has a folded optics structure in which a light path is bent a plurality of times between the plurality of reflection surfaces, the plurality of reflection surfaces are optically facing each other so that light incident through the second light incident region is emitted to the light emission region, the plurality of reflection surfaces are formed in a ring shape and an optical axis of each of the plurality of reflection surfaces is the common optical axis, and radii of each of the plurality of reflection surfaces with respect to the common optical axis decreases in a direction to which light incident through the second light incident region proceeds.

8. The dual focus lens of claim 7,
wherein the surfaces of the transparent substrate where the first light incident region and the light emission region are formed on, respectively, are curved surfaces.

9. The dual focus lens of claim 1, further comprising a first shutter transmitting or blocking light incident on the refractive optical system, and a second shutter transmitting or blocking light incident on the reflective optical system.

10. The dual focus lens of claim 9, wherein the first and second shutters are configured such that one transmits light and the other blocks light, selectively, and at least one of the first and second shutters are divided into at least two segments that are independently driven in a circumference direction.

11. The dual focus lens of claim 1, further comprising at least one light source that is located in a space surrounding the refractive optical system.

12. An image pickup apparatus comprising:
the dual focus lens of claim 1; and
an image sensor located at an image side of the dual focus lens.

13. The image pickup apparatus of claim 12, wherein the image sensor is configured to be movable along the common optical axis or a direction perpendicular to the common optical axis, and the image sensor moves to the first image plane while the refractive optical system is photographing, and moves to the second image plane while the reflective optical system is photographing.

14. The image pickup apparatus of claim 12, wherein the refractive optical system is configured to form a first image having a first magnification, the reflective optical system is configured to form a second image having a second magnification that is greater than the first magnification, a third image having a magnification between the first magnification and the second magnification is formed by cropping and magnifying the first image, reducing the second image, and synthesizing the first image and second images.

15. A dual focus lens comprising:
a refractive optical system having a first focal length, the refractive optical system comprising at least one refractive lens element;

a reflective optical system having a second focal length that is different from the first focal length, the reflective optical system comprising a plurality of reflection surfaces; and a transparent substrate, the plurality of reflection surfaces being fixed onto a plurality of surfaces of the transparent substrate, respectively, wherein the refractive optical system and the reflective optical system respectively have a first image plane a second image plane, the refractive optical system and the reflective optical system are both located at an object side with respect to the first and second image planes, the refractive optical system and the reflective optical system are located having a common optical axis in a center of the refractive optical system and a center of the reflective optical system, wherein the plurality of reflection surfaces comprises a first reflection surface, a second reflection surface, a third reflection surface, and a fourth reflection surface, respectively, on each side of the common optical axis, the plurality of surfaces of the transparent substrate comprises a first surface onto which the first reflection surface is fixed, a second surface onto which the second reflection surface is fixed, a third surface onto which the third reflection surface is fixed, and a fourth surface onto which the fourth reflection surface is fixed, and the first surface and the third surface are disposed opposite to the second surface and the fourth surface.

16. The dual focus lens of claim 15, wherein the reflective optical system comprises a first light incident region formed on the center of the reflective optical system, and a second light incident region formed on an outer circumference of the refractive optical system in a ring shape, the fourth surface of the transparent substrate faces the refractive optical system, the first light incident region is disposed in a center region of the fourth surface, and the fourth reflection surface is disposed in a circumference region of the fourth surface.

17. The dual focus lens of claim 16, the center region of the fourth surface and the circumference region of the fourth surface have different radii of curvature.

18. The dual focus lens of claim 16, the center region of the fourth surface and the circumference region of the fourth surface have different aspheric coefficients.

* * * * *